United States Patent
Ha et al.

(10) Patent No.: US 10,366,610 B2
(45) Date of Patent: Jul. 30, 2019

(54) VEHICLE CONTROL DEVICE MOUNTED AT VEHICLE AND METHOD FOR CONTROLLING VEHICLE

(71) Applicant: LG ELECTRONICS INC., Seoul (KR)

(72) Inventors: Daegeun Ha, Seoul (KR); Hyunseok Shin, Seoul (KR)

(73) Assignee: LG Electronics Inc., Seoul (KR)

( * ) Notice: Subject to any disclaimer, the term of this patent is extended or adjusted under 35 U.S.C. 154(b) by 44 days.

(21) Appl. No.: 15/676,368

(22) Filed: Aug. 14, 2017

(65) Prior Publication Data

US 2018/0130351 A1 May 10, 2018

(30) Foreign Application Priority Data

Nov. 4, 2016 (KR) .................. 10-2016-0146794

(51) Int. Cl.
*B60R 1/00* (2006.01)
*G06K 9/00* (2006.01)
(Continued)

(52) U.S. Cl.
CPC .............. *G08G 1/143* (2013.01); *B60R 1/00* (2013.01); *G01S 19/51* (2013.01); *G06K 9/00812* (2013.01); *G06Q 10/02* (2013.01); *G06T 11/60* (2013.01); *G07B 15/00* (2013.01); *G08G 1/148* (2013.01); *G08G 1/149* (2013.01);
(Continued)

(58) Field of Classification Search
CPC .............. B60R 1/00; B60R 2300/301; B60R 2300/308; B60R 2300/804; B60R 2300/806; G08G 1/143; G08G 1/148; G08G 1/149; G01S 19/51; G06K 9/00812; G06Q 10/02; G06T 11/60; G07B 15/00; G07B 15/02
See application file for complete search history.

(56) References Cited

U.S. PATENT DOCUMENTS

2009/0171567 A1* 7/2009 Morimoto .......... G01C 21/3605
701/465
2010/0007525 A1 1/2010 Shanbhag
(Continued)

FOREIGN PATENT DOCUMENTS

EP   3072710 B1   9/2016
JP   2002297801   10/2002
(Continued)

OTHER PUBLICATIONS

Extended European Search Report in European Application No. 17183812.1, dated Feb. 19, 2018, 7 pages.

*Primary Examiner* — Huy T Nguyen
(74) *Attorney, Agent, or Firm* — Fish & Richardson P.C.

(57) ABSTRACT

A vehicle control device that includes: a camera that is configured to capture an outside image of a vehicle in real time; a display that is configured to present the outside image of the vehicle in real time; and a controller that is configured to (i) detect, from the outside image, a virtual parking-available space that corresponds to an actual parking-available space in an area captured in the outside image and that is tagged in the outside image, (ii) generate parking space information based on the virtual parking-available space, and (iii) provide the parking space information to the display to overlay the parking space information over the outside image on the display is disclosed.

20 Claims, 13 Drawing Sheets

(51) Int. Cl.
| | | |
|---|---|---|
| *G08G 1/14* | (2006.01) | |
| *G01S 19/51* | (2010.01) | |
| *G06Q 10/02* | (2012.01) | |
| *G06T 11/60* | (2006.01) | |
| *G07B 15/00* | (2011.01) | |
| *G07B 15/02* | (2011.01) | |

(52) U.S. Cl.
 CPC ... *B60R 2300/301* (2013.01); *B60R 2300/308* (2013.01); *B60R 2300/804* (2013.01); *B60R 2300/806* (2013.01); *G07B 15/02* (2013.01)

(56) References Cited

U.S. PATENT DOCUMENTS

| | | | |
|---|---|---|---|
| 2016/0005316 A1* | 1/2016 | Lee | G06T 3/4038 |
| | | | 348/38 |
| 2016/0140774 A1* | 5/2016 | Weinberger | G07B 15/02 |
| | | | 705/13 |
| 2017/0118307 A1* | 4/2017 | Beaurepaire | G01C 21/3685 |
| 2017/0154530 A1* | 6/2017 | Irion | G01C 21/3685 |

FOREIGN PATENT DOCUMENTS

| | | |
|---|---|---|
| JP | 2008123044 | 5/2008 |
| JP | 2011100184 | 5/2011 |
| JP | 2011227874 | 11/2011 |
| JP | 2012177673 | 9/2012 |
| JP | 2013216307 | 10/2013 |
| KR | 1102408 B1 | 1/2012 |
| KR | 10-2013-0055180 | 5/2013 |

\* cited by examiner

VEHICLE CONTROL DEVICE MOUNTED AT VEHICLE AND METHOD FOR CONTROLLING VEHICLE

CROSS-REFERENCE TO RELATED APPLICATION

Pursuant to 35 U.S.C. § 119(a), this application claims the benefit of an earlier filing date of and the right of priority to Korean Patent Application No. 10-2016-0146794, filed on Nov. 4, 2016, the content of which is incorporated by reference herein in its entirety.

TECHNICAL FIELD

The present application generally relates to technologies related to a vehicle control device for a vehicle.

BACKGROUND

A vehicle is an apparatus which can be driven by a user who gets therein in a desired direction, and a representative example may be a car.

For convenience of a user using a vehicle, various sensors and electronic devices are equipped in the vehicle. Specifically, a study on an Advanced Driver Assistance System (ADAS) is actively undergoing. In addition, an autonomous vehicle is actively under development.

A vehicle may be provided with various types of lamps. In general, the vehicle includes various vehicle lamps having a lighting function of facilitating articles or objects near the vehicle to be recognized during driving at night, and a signaling function of notifying a driving state of the vehicle to other vehicles or pedestrians.

For example, the vehicle may include devices operating in a manner of directly emitting light using lamps, such as a head lamp emitting light to a front side to ensure a driver's view, a brake lamp turned on when slamming the brake on, turn indicator lamps used upon a left turn or a right turn.

As another example, reflectors for reflecting light to facilitate the vehicle to be recognized from outside are mounted on front and rear sides of the vehicle.

Installation criteria and standards of the lamps for the vehicle are regulated as rules to fully exhibit each function.

In this example, as the development of the advanced deriving assist system (ADAS) is actively undergoing in recent time, development of a technology for optimizing user's convenience and safety while driving a vehicle is required.

As one effort, technologies for various user interfaces/ user experiences (UI/UX) between a mobile terminal and a vehicle and technologies for autonomous driving that a vehicle drives by itself without a driver's manipulation and autonomous parking are under active development. For example, the vehicle autonomously parks by itself by recognizing parking lines through cameras.

SUMMARY

In general, one innovative aspect of the subject matter described in this specification can be implemented in a vehicle control device comprising: a camera that is configured to capture an outside image of a vehicle in real time; a display that is configured to present the outside image of the vehicle in real time; and a controller that is configured to (i) detect, from the outside image, a virtual parking-available space that corresponds to an actual parking-available space in an area captured in the outside image and that is tagged in the outside image, (ii) generate parking space information based on the virtual parking-available space, and (iii) provide the parking space information to the display to overlay the parking space information over the outside image on the display.

The foregoing and other implementations can each optionally include one or more of the following features, alone or in combination. In particular, one implementation includes all the following features in combination. The parking space information includes: a virtual parking line that indicates the virtual parking-available space in the outside image and that is overlaid over the outside image on the display. The parking space information includes: at least one of a parking-available time, a parking fee, or a parking request approval message, and wherein the controller is configured to: determine whether the vehicle enters the actual parking-available space that corresponds to the virtual parking-available space, and based on a determination that the vehicle enters the actual parking-available space, provide the parking space information to the display. The controller is configured to: send a parking request to a server computer system that manages the actual parking-available space, in response to the parking request, receiving a parking approval message from the server computer system, and make a transaction to pay a parking fee for the actual parking-available space. The controller is configured to: determine a location of the vehicle relative to the actual parking-available space based on (i) a global positioning system (GPS) signal or (ii) a vehicle detection signal that is received from a parking position detecting sensor located in the actual parking-available space. The controller is configured to: based on the location of the vehicle, determine whether the vehicle enters the actual parking-available space, based on a determination that the vehicle enters the actual parking-available space, receive, from the parking position detecting sensor, a notification signal that represents whether the vehicle is authorized or reserved to park in the actual parking-available space corresponding the virtual parking-available space, and provide the notification signal to the display. The controller is configured to: based on the notification signal that represents that the vehicle is unauthorized or unreserved to park in the actual parking-available space, search for a first virtual parking-available space that is adjacent to the location of the vehicle, and provide, to the display, navigation information to a first actual parking-available space corresponding to the first virtual parking-available space. The controller is configured to: provide, to a server computer system, registration information that requests to register a current location of the vehicle as the virtual parking-available space. The controller is configured to: in response to user input to call a parking space setting menu, provide a graphical user interface to the display, the graphical user interface including: a first item to receive first information regarding a parking-available space, a second item to receive second information regarding a parking-available time for the parking-available space, and a third item to receive third information regarding a parking fee for the parking-available space. The controller is configured to: transmit the first information, the second information, and the third information to a first vehicle through one or more networks. The controller is configured to: determine that a parked position of the vehicle is the parking-available space without receiving the first information from a user. The controller is configured to: receive first user input that selects the first item of the graphical user interface, in response to the first user input, provide, to the display, a preview image that is captured by the camera in real time and that includes one or more objects, receive second user input that selects a first object from the one or more objects, and in response to the second user input, determine that a location corresponding to the first object is the parking-available space without receiving the first information from a user. The controller is configured to: receive first user input that selects the first item of the graphical user interface, in response to the first user input, provide, to the display, a preview image that is captured by the camera in real time and that includes one or more objects, receive second user input that selects a first object from the one or more objects, and in response to the second user input, provide, to the display, an area image that is overlaid over the first object on the preview image. The area image represents a virtual parking line. The controller is configured to: provide, to a server computer system, registration information that requests to register coordinate values corresponding to a current location of the vehicle as the parking-available space. The graphical user interface further includes: a fourth item to receive fourth information regarding a type of a vehicle to be parked at the parking-available space. The controller is configured to: determine whether the vehicle is within a first distance from the actual parking-available space corresponding to the virtual parking-available space, and based on a determination that the vehicle is within the first distance from the actual parking-available space, initiate detecting the virtual parking-available space from the outside image in real time. The controller is configured to: determine a speed of the vehicle, and based on the speed of the vehicle, initiate detecting the virtual parking-available space from the outside image in real time. The controller is configured to: determine whether a parking-available time for the parking-available space has elapsed, and based on a determination that the parking-available time has elapsed, generate a notification message and provide the notification message to the display. The controller is configured to: determine whether a parking-available time for the parking-available space has elapsed, and based on a determination that the parking-available time has elapsed, make a transaction to pay for a parking fee for the virtual parking-available space. The controller is configured to: detect a plurality of virtual parking-available spaces from the outside image, obtain priority information that represents priorities among the plurality of virtual parking-available spaces, based on the priority information, determine a first virtual parking-available space from the plurality of virtual parking-available spaces, and provide, to the display, (i) the first virtual parking-available space with emphasis and (ii) other virtual parking-available spaces of the plurality of virtual parking-available spaces other than the first virtual parking-available space without emphasis.

In general, another innovative aspect of the subject matter described in this specification can be implemented in a method for controlling a vehicle, the method comprising: capturing an outside image of a vehicle in real time using a camera; displaying the outside image of the vehicle in real time on a display; detecting, from the outside image, a virtual parking-available space that corresponds to an actual parking-available space in an area captured in the outside image and that is tagged in the outside image; generating parking space information based on the virtual parking-available space; and providing the parking space information to the display to overlay the parking space information over the outside image to be presented on the display.

The subject matter described in this specification can be implemented in particular examples so as to realize one or more of the following advantages. Comparing to a conventional vehicle control device, a vehicle control device can provide parking space information to multiple vehicles using AR information. For example, the vehicle control device allows an owner of an actual parking-available space to lend the actual parking-available space to multiple drivers using the AR information.

In addition, the vehicle control device enhances user experience of finding a parking-available space using AR information. For example, the vehicle control device provides parking space information to a user through a graphic user interface presenting various graphics. The user can easily and intuitively find the parking available space through the graphics.

The details of one or more examples of the subject matter described in this specification are set forth in the accompanying drawings and the description below. Other potential features, aspects, and advantages of the subject matter will become apparent from the description, the drawings, and the claim.

BRIEF DESCRIPTION OF THE DRAWINGS

Like reference numbers and designations in the various drawings indicate like elements.

DETAILED DESCRIPTION

In this specification a vehicle includes a car, a bike, a truck, a cart, etc. In FIGS. 1 to 17, the vehicle is illustrated as a car. However, in some other implementations, the vehicle can be any other suitable vehicle described above.

The vehicle includes an internal combustion engine vehicle having an engine as a power source, a hybrid vehicle having both an engine and an electric motor as power sources, an electric vehicle having an electric motor as a power source.

In this specification, a left side of a vehicle represents a left side of the vehicle toward a driving direction of the vehicle, and a right side of the vehicle represents a right side of the vehicle toward the driving direction.

Figure 1:
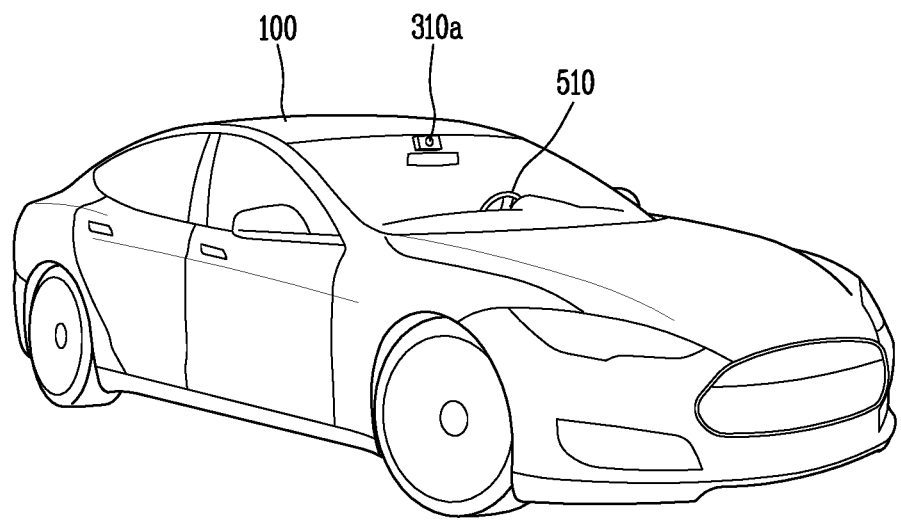
FIGS. 1 and 2 are diagrams illustrating an example vehicle.
Figure 1:
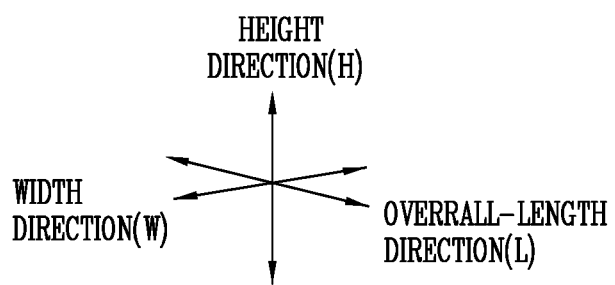
Figure 2:
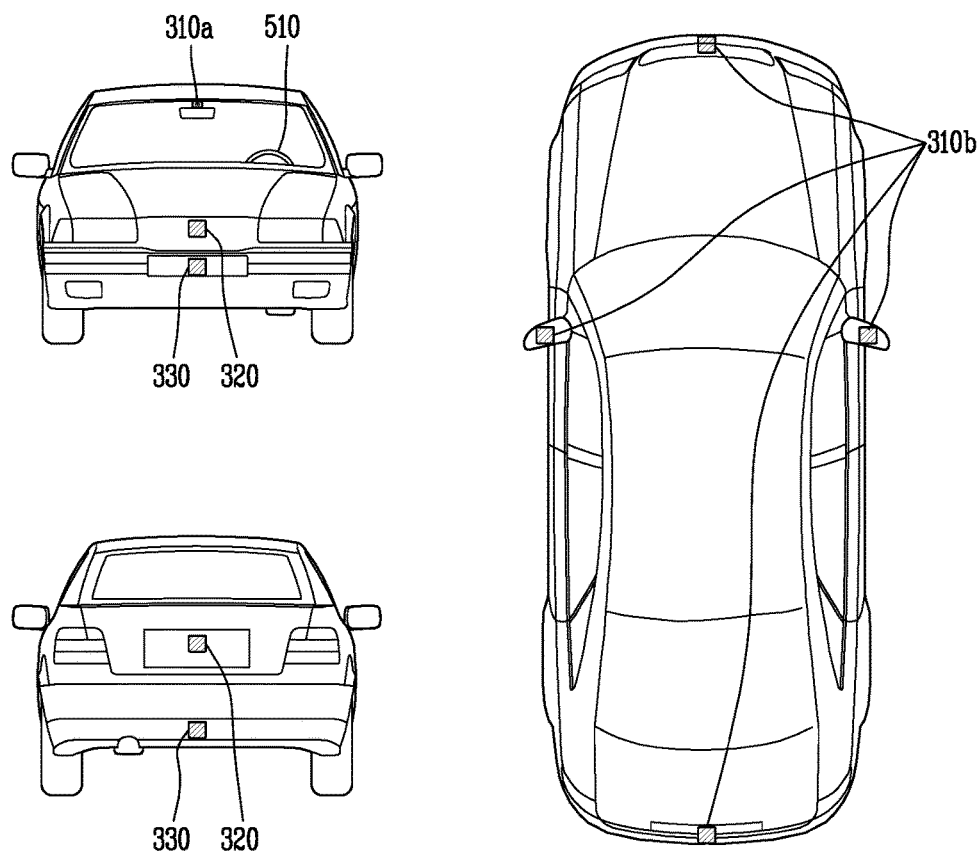
Figure 3:
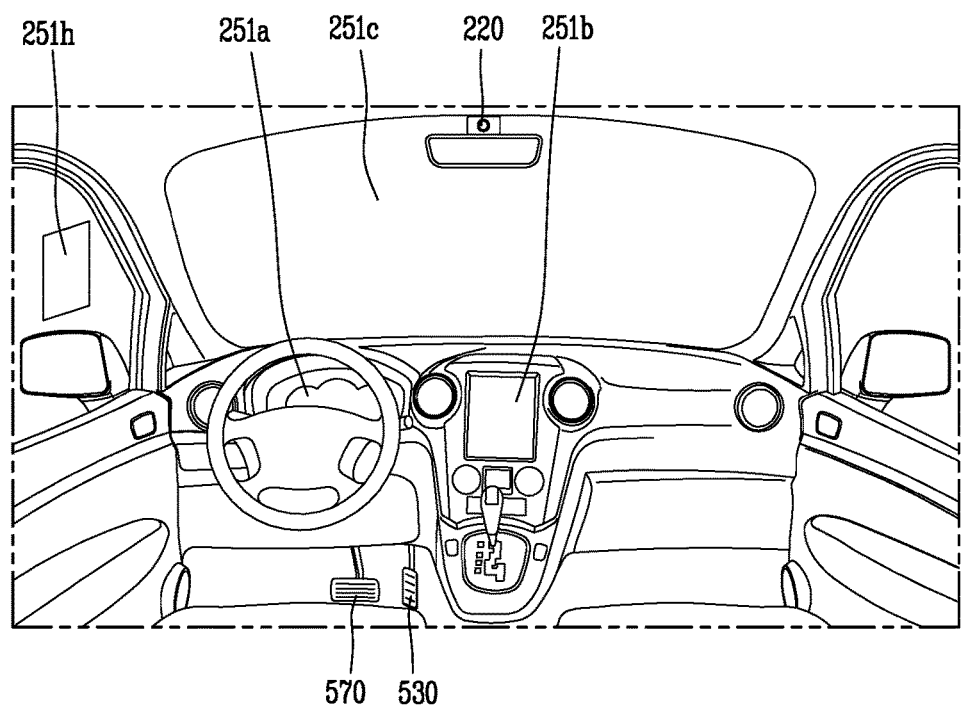
FIGS. 3 and 4 are diagrams illustrating an example interior of an example vehicle.
Figure 4:
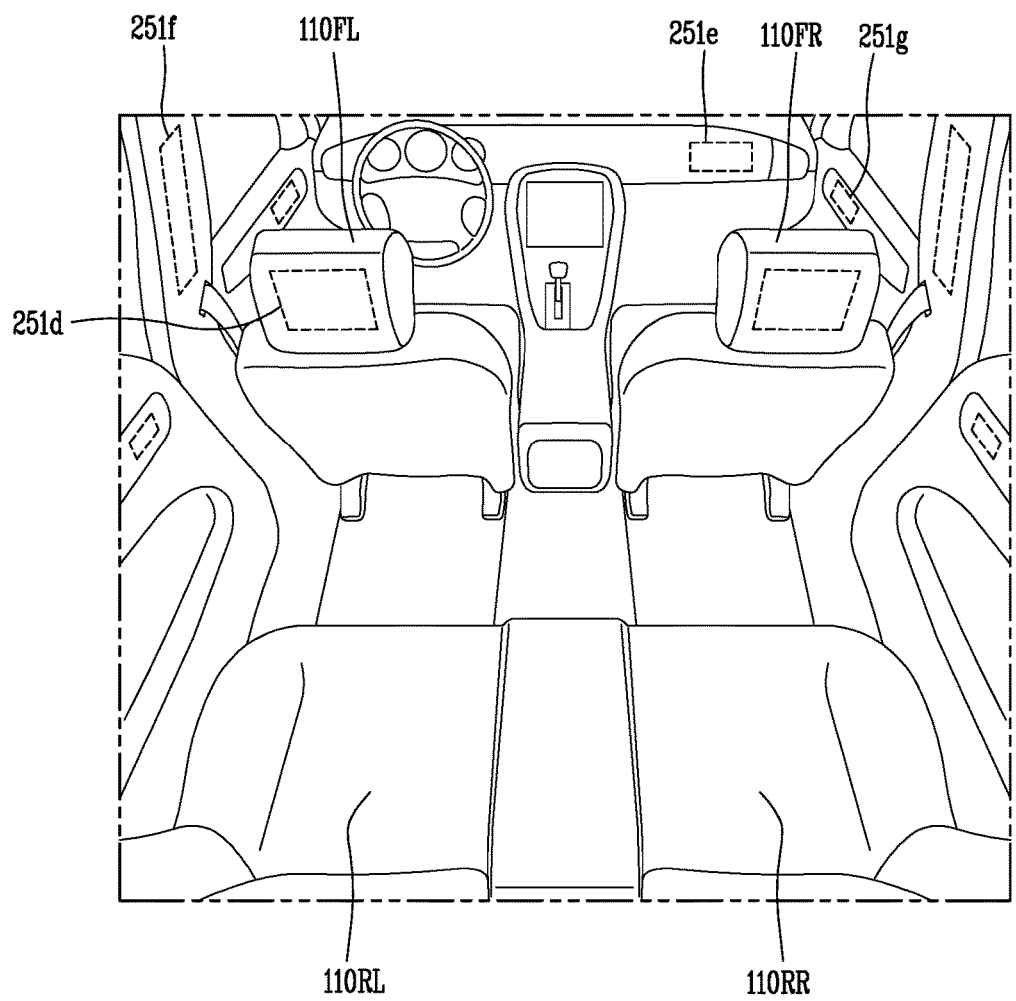
Figure 5:
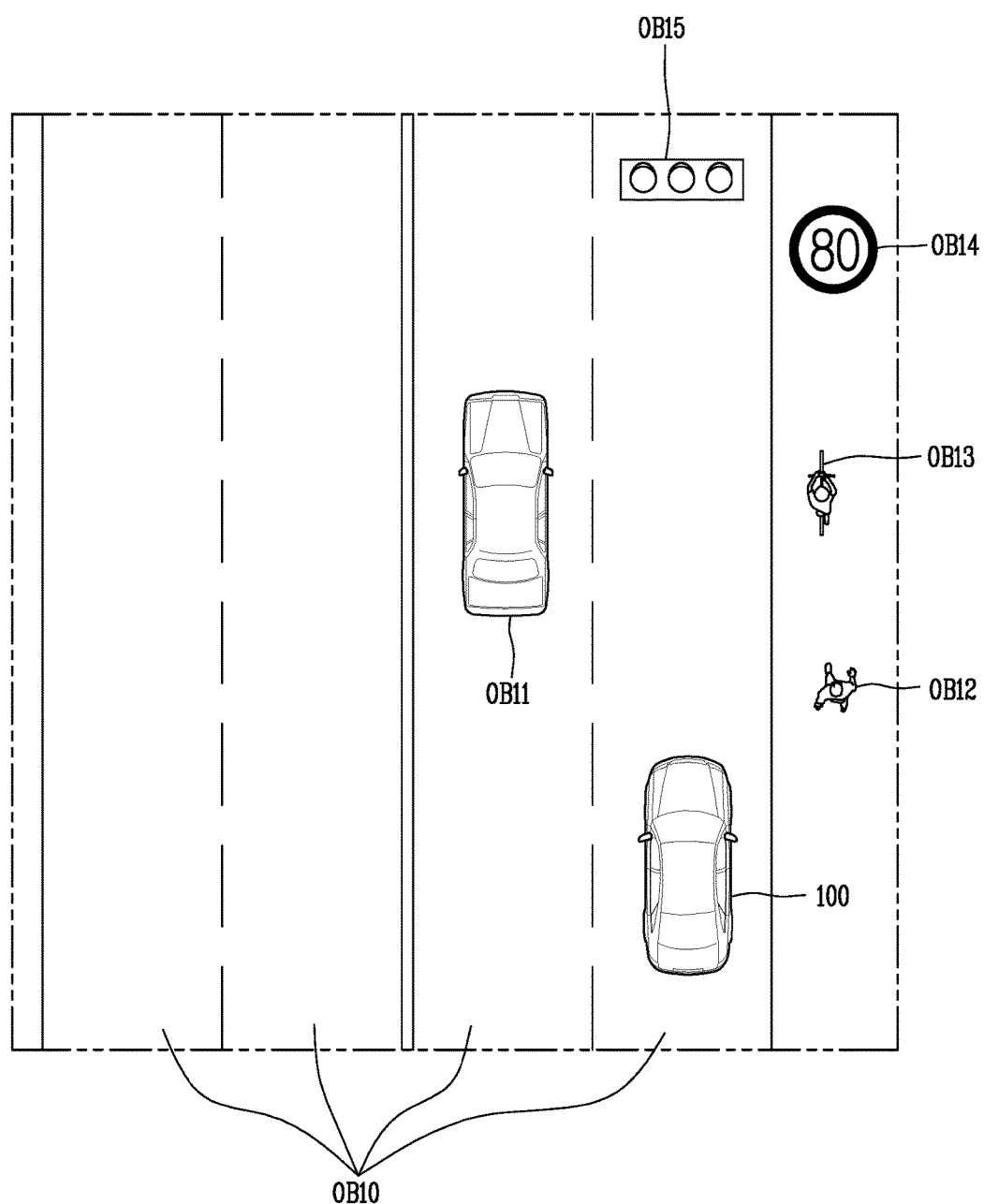
FIGS. 5 and 6 are diagrams illustrating example objects outside of an example vehicle.
Figure 6:
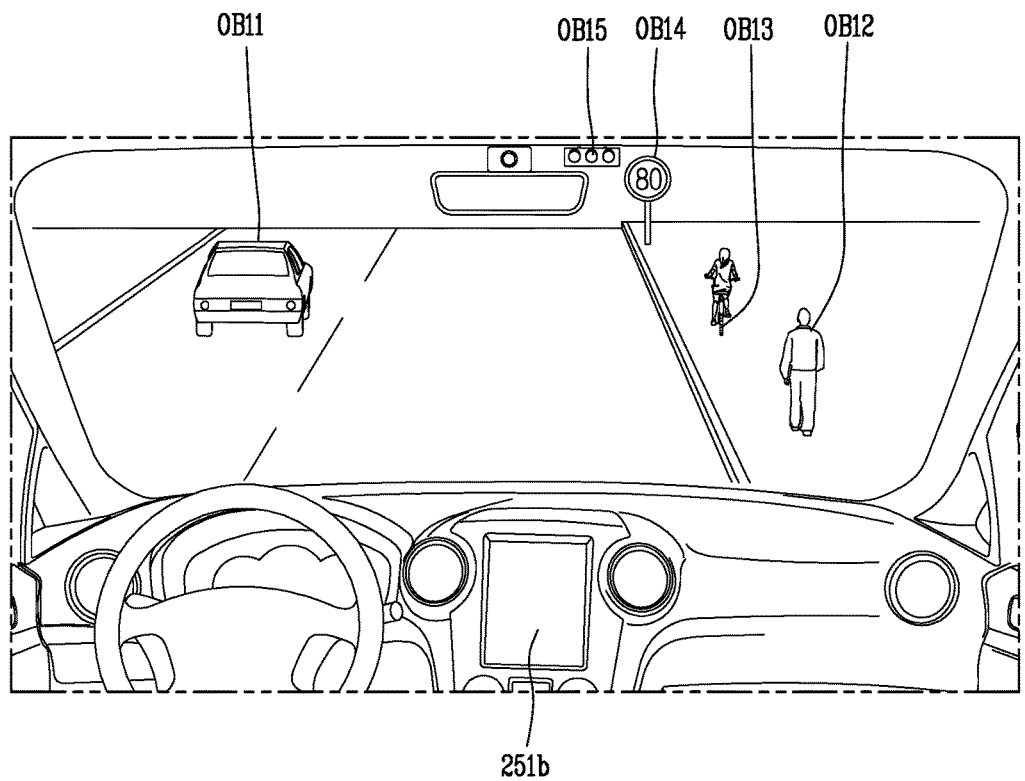
Figure 7:
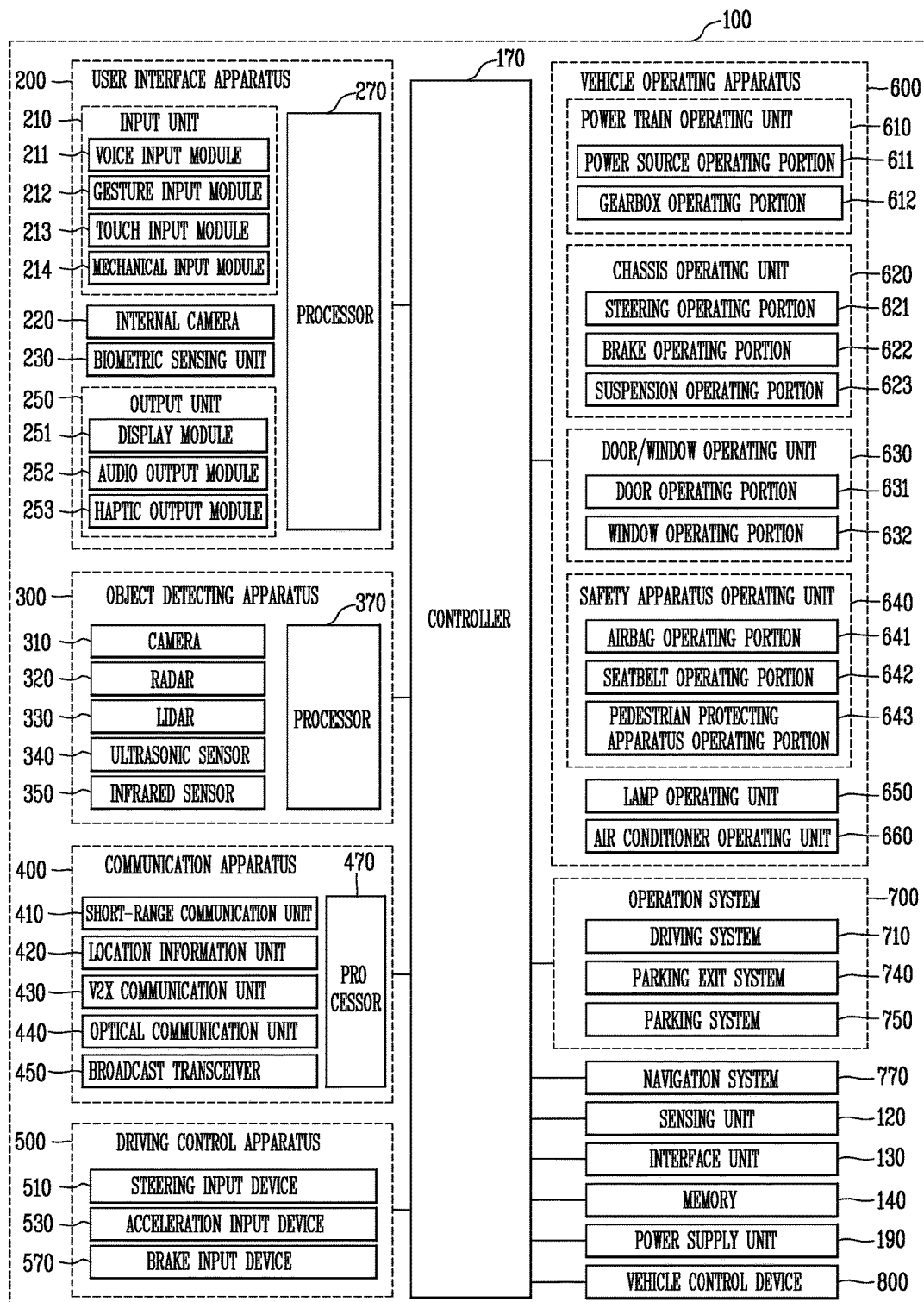
FIG. 7 is a diagram illustrating an example vehicle system.

FIG. 1 illustrates an example vehicle. FIG. 2 illustrates an example vehicle. FIGS. 3 and 4 illustrate example an interior of an example vehicle. FIGS. 5 and 6 illustrate example objects outside of an example vehicle. FIG. 7 illustrates an example vehicle system.

As illustrated in FIGS. 1 to 7, a vehicle 100 may include wheels turning by a driving force, and a steering apparatus 510 for adjusting a driving (ongoing, moving) direction of the vehicle 100.

The vehicle 100 may be an autonomous vehicle.

The vehicle 100 may be switched into an autonomous mode or a manual mode based on a user input.

For example, the vehicle may be converted from the manual mode into the autonomous mode or from the autonomous mode into the manual mode based on a user input received through a user interface apparatus 200.

The vehicle 100 may be switched into the autonomous mode or the manual mode based on driving environment information. The driving environment information may be generated based on object information provided from an object detecting apparatus 300.

For example, the vehicle 100 may be switched from the manual mode into the autonomous mode or from the autonomous module into the manual mode based on driving environment information generated in the object detecting apparatus 300.

In an example, the vehicle 100 may be switched from the manual mode into the autonomous mode or from the autonomous module into the manual mode based on driving environment information received through a communication apparatus 400.

The vehicle 100 may be switched from the manual mode into the autonomous mode or from the autonomous module into the manual mode based on information, data or signal provided from an external device.

When the vehicle 100 is driven in the autonomous mode, the autonomous vehicle 100 may be driven based on an operation system 700.

For example, the autonomous vehicle 100 may be driven based on information, data or signal generated in a driving system 710, a parking exit system 740 and a parking system 750.

When the vehicle 100 is driven in the manual mode, the autonomous vehicle 100 may receive a user input for driving through a driving control apparatus 500. The vehicle 100 may be driven based on the user input received through the driving control apparatus 500.

An overall length refers to a length from a front end to a rear end of the vehicle 100, a width refers to a width of the vehicle 100, and a height refers to a length from a bottom of a wheel to a roof. In the following description, an overall-length direction L may refer to a direction which is a criterion for measuring the overall length of the vehicle 100, a width direction W may refer to a direction that is a criterion for measuring a width of the vehicle 100, and a height direction H may refer to a direction that is a criterion for measuring a height of the vehicle 100.

As illustrated in FIG. 7, the vehicle 100 may include a user interface apparatus 200, an object detecting apparatus 300, a communication apparatus 400, a driving control apparatus 500, a vehicle operating apparatus 600, an operation system 700, a navigation system 770, a sensing unit 120, an interface unit 130, a memory 140, a controller 170 and a power supply unit 190.

The vehicle 100 may include more components in addition to components to be explained in this specification or may not include some of those components to be explained in this specification.

The user interface apparatus 200 is an apparatus for communication between the vehicle 100 and a user. The user interface apparatus 200 may receive a user input and provide information generated in the vehicle 100 to the user. The vehicle 200 may implement user interfaces (UIs) or user experiences (UXs) through the user interface apparatus 200.

The user interface apparatus 200 may include an input unit 210, an internal camera 220, a biometric sensing unit 230, an output unit 250 and a processor 270.

The user interface apparatus 200 may include more components in addition to components to be explained in this specification or may not include some of those components to be explained in this specification.

The input unit 200 may allow the user to input information. Data collected in the input unit 120 may be analyzed by the processor 270 and processed as a user's control command.

The input unit 210 may be disposed within the vehicle. For example, the input unit 200 may be disposed on one area of a steering wheel, one area of an instrument panel, one area of a seat, one area of each pillar, one area of a door, one area of a center console, one area of a headlining, one area of a sun visor, one area of a wind shield, one area of a window or the like.

The input unit 210 may include a voice input module 211, a gesture input module 212, a touch input module 213, and a mechanical input module 214.

The audio input module 211 may convert a user's voice input into an electric signal. The converted electric signal may be provided to the processor 270 or the controller 170.

The voice input module 211 may include at least one microphone.

The gesture input module 212 may convert a user's gesture input into an electric signal. The converted electric signal may be provided to the processor 270 or the controller 170.

The gesture input module 212 may include at least one of an infrared sensor and an image sensor for detecting the user's gesture input.

The gesture input module 212 may detect a user's three-dimensional (3D) gesture input. To this end, the gesture input module 212 may include a light emitting diode outputting a plurality of infrared rays or a plurality of image sensors.

The gesture input module 212 may detect the user's 3D gesture input by a time of flight (TOF) method, a structured light method or a disparity method.

The touch input module 213 may convert the user's touch input into an electric signal. The converted electric signal may be provided to the processor 270 or the controller 170.

The touch input module 213 may include a touch sensor for detecting the user's touch input.

The touch input module 213 may be integrated with the display unit 251 so as to implement a touch screen. The touch screen may provide an input interface and an output interface between the vehicle 100 and the user.

The mechanical input module 214 may include at least one of a button, a dome switch, a jog wheel and a jog switch. An electric signal generated by the mechanical input module 214 may be provided to the processor 270 or the controller 170.

The mechanical input module 214 may be arranged on a steering wheel, a center fascia, a center console, a cockpit module, a door and the like.

The internal camera 220 may acquire an internal image of the vehicle. The processor 270 may detect a user's state based on the internal image of the vehicle. The processor 270 may acquire information related to the user's gaze from the internal image of the vehicle. The processor 270 may detect a user gesture from the internal image of the vehicle.

The biometric sensing unit 230 may acquire the user's biometric information. The biometric sensing module 230 may include a sensor for detecting the user's biometric information and acquire fingerprint information and heart rate information regarding the user using the sensor. The biometric information may be used for user authentication.

The output unit 250 may generate an output related to a visual, audible or tactile signal.

The output unit 250 may include at least one of a display module 251, an audio output module 252 and a haptic output module 253.

The display module 251 may output graphic objects corresponding to various types of information.

The display module 251 may include at least one of a liquid crystal display (LCD), a thin film transistor-LCD (TFT LCD), an organic light-emitting diode (OLED), a flexible display, a three-dimensional (3D) display and an e-ink display.

The display module 251 may be inter-layered or integrated with a touch input module 213 to implement a touch screen.

The display module 251 may be implemented as a head up display (HUD). When the display module 251 is implemented as the HUD, the display module 251 may be provided with a projecting module so as to output information through an image which is projected on a windshield or a window.

The display module 251 may include a transparent display. The transparent display may be attached to the windshield or the window.

The transparent display may have a predetermined degree of transparency and output a predetermined screen thereon. The transparent display may include at least one of a thin film electroluminescent (TFEL), a transparent OLED, a transparent LCD, a transmissive transparent display and a transparent LED display. The transparent display may have adjustable transparency.

In this example, the user interface apparatus 200 may include a plurality of display modules 251a to 251g.

The display module 251 may be disposed on one area of a steering wheel, one area 521a, 251b, 251e of an instrument panel, one area 251d of a seat, one area 251f of each pillar, one area 251g of a door, one area of a center console, one area of a headlining or one area of a sun visor, or implemented on one area 251c of a windshield or one area 251h of a window.

The audio output module 252 converts an electric signal provided from the processor 270 or the controller 170 into an audio signal for output. To this end, the audio output module 252 may include at least one speaker.

The haptic output module 253 generates a tactile output. For example, the haptic output module 253 may vibrate the steering wheel, a safety belt, a seat 110FL, 110FR, 110RL, 110RR such that the user can recognize such output.

The processor 270 may control an overall operation of each unit of the user interface apparatus 200.

The user interface apparatus 200 may include a plurality of processors 270 or may not include any processor 270.

When the processor 270 is not included in the user interface apparatus 200, the user interface apparatus 200 may operate based on a control of a processor of another apparatus within the vehicle 100 or the controller 170.

In this example, the user interface apparatus 200 may be called as a display apparatus for vehicle.

The user interface apparatus 200 may operate based on the control of the controller 170.

The object detecting apparatus 300 is an apparatus for detecting an object located at outside of the vehicle 100.

The object may be a variety of objects associated with driving (operation) of the vehicle 100.

Referring to FIGS. 5 and 6, an object O may include a traffic lane OB10, another vehicle OB11, a pedestrian OB12, a two-wheeled vehicle OB13, traffic signals OB14 and OB15, light, a road, a structure, a speed hump, a geographical feature, an animal and the like.

The lane OB10 may be a driving lane, a lane next to the driving lane or a lane on which another vehicle comes in an opposite direction to the vehicle 100. The lanes OB10 may be a concept including left and right lines forming a lane.

The another vehicle OB11 may be a vehicle which is moving around the vehicle 100. The another vehicle OB11 may be a vehicle located within a predetermined distance from the vehicle 100. For example, the another vehicle OB11 may be a vehicle which moves before or after the vehicle 100.

The pedestrian OB12 may be a person located near the vehicle 100. The pedestrian OB12 may be a person located within a predetermined distance from the vehicle 100. For example, the pedestrian OB12 may be a person located on a sidewalk or roadway.

The two-wheeled vehicle OB13 may refer to a vehicle (transportation facility) that is located near the vehicle 100 and moves using two wheels. The two-wheeled vehicle OB13 may be a vehicle that is located within a predetermined distance from the vehicle 100 and has two wheels. For example, the two-wheeled vehicle OB13 may be a motorcycle or a bicycle that is located on a sidewalk or roadway.

The traffic signals may include a traffic light OB15, a traffic sign OB14 and a pattern or text drawn on a road surface.

The light may be light emitted from a lamp provided on another vehicle. The light may be light generated from a streetlamp. The light may be solar light.

The road may include a road surface, a curve, an upward slope, a downward slope and the like.

The structure may be an object that is located near a road and fixed on the ground. For example, the structure may include a streetlamp, a roadside tree, a building, an electric pole, a traffic light, a bridge and the like.

The geographical feature may include a mountain, a hill and the like.

In this example, objects may be classified into a moving object and a fixed object. For example, the moving object may be a concept including another vehicle and a pedestrian. The fixed object may be a concept including a traffic signal, a road and a structure.

The object detecting apparatus 300 may include a camera 310, a radar 320, a LiDAR 330, an ultrasonic sensor 340, an infrared sensor 350 and a processor 370.

The object detecting apparatus 300 may further include other components in addition to the components described, or may not include some of the components described.

The camera 310 may be located on an appropriate portion outside the vehicle to acquire an external image of the vehicle. The camera 310 may be a mono camera, a stereo camera 310a, an around view monitoring (AVM) camera 310b or a 360-degree camera.

For example, the camera 310 may be disposed adjacent to a front windshield within the vehicle to acquire a front image of the vehicle. Or, the camera 310 may be disposed adjacent to a front bumper or a radiator grill.

For example, the camera 310 may be disposed adjacent to a rear glass within the vehicle to acquire a rear image of the vehicle. Or, the camera 310 may be disposed adjacent to a rear bumper, a trunk or a tail gate.

For example, the camera 310 may be disposed adjacent to at least one of side windows within the vehicle to acquire a side image of the vehicle. Or, the camera 310 may be disposed adjacent to a side mirror, a fender or a door.

The camera 310 may provide an acquired image to the processor 370.

The radar 320 may include electric wave transmitting and receiving portions. The radar 320 may be implemented as a pulse radar or a continuous wave radar based on a principle of emitting electric waves. The radar 320 may be implemented in a frequency modulated continuous wave (FMCW) manner or a frequency shift keying (FSK) manner based on a signal waveform, among the continuous wave radar methods.

The radar 320 may detect an object in a time of flight (TOF) manner or a phase-shift manner through the medium of the electric wave, and detect a position of the detected object, a distance from the detected object and a relative speed with the detected object.

The radar 320 may be disposed on an appropriate position outside the vehicle for detecting an object which is located at a front, rear or side of the vehicle.

The LiDAR 330 may include laser transmitting and receiving portions. The LiDAR 330 may be implemented in a time of flight (TOF) manner or a phase-shift manner.

The LiDAR 330 may be implemented as a drive type or a non-drive type.

For the drive type, the LiDAR 330 may be rotated by a motor and detect object near the vehicle 100.

For the non-drive type, the LiDAR 330 may detect, through light steering, objects which are located within a predetermined range based on the vehicle 100. The vehicle 100 may include a plurality of non-drive type LiDARs 330.

The LiDAR 330 may detect an object in a TOP manner or a phase-shift manner through the medium of a laser beam, and detect a position of the detected object, a distance from the detected object and a relative speed with the detected object.

The LiDAR 330 may be disposed on an appropriate position outside the vehicle for detecting an object located at the front, rear or side of the vehicle.

The ultrasonic sensor 340 may include ultrasonic wave transmitting and receiving portions. The ultrasonic sensor 340 may detect an object based on an ultrasonic wave, and detect a position of the detected object, a distance from the detected object and a relative speed with the detected object.

The ultrasonic sensor 340 may be disposed on an appropriate position outside the vehicle for detecting an object located at the front, rear or side of the vehicle.

The infrared sensor 350 may include infrared light transmitting and receiving portions. The infrared sensor 340 may detect an object based on infrared light, and detect a position of the detected object, a distance from the detected object and a relative speed with the detected object.

The infrared sensor 350 may be disposed on an appropriate position outside the vehicle for detecting an object located at the front, rear or side of the vehicle.

The processor 370 may control an overall operation of each unit of the object detecting apparatus 300.

The processor 370 may detect an object based on an acquired image, and track the object. The processor 370 may execute operations, such as a calculation of a distance from the object, a calculation of a relative speed with the object and the like, through an image processing algorithm.

The processor 370 may detect an object based on a reflected electromagnetic wave which an emitted electromagnetic wave is reflected from the object, and track the object. The processor 370 may execute operations, such as a calculation of a distance from the object, a calculation of a relative speed with the object and the like, based on the electromagnetic wave.

The processor 370 may detect an object based on a reflected laser beam which an emitted laser beam is reflected from the object, and track the object. The processor 370 may execute operations, such as a calculation of a distance from the object, a calculation of a relative speed with the object and the like, based on the laser beam.

The processor 370 may detect an object based on a reflected ultrasonic wave which an emitted ultrasonic wave is reflected from the object, and track the object. The processor 370 may execute operations, such as a calculation of a distance from the object, a calculation of a relative speed with the object and the like, based on the ultrasonic wave.

The processor 370 may detect an object based on reflected infrared light which emitted infrared light is reflected from the object, and track the object. The processor 370 may execute operations, such as a calculation of a distance from the object, a calculation of a relative speed with the object and the like, based on the infrared light.

The object detecting apparatus 300 may include a plurality of processors 370 or may not include any processor 370. For example, each of the camera 310, the radar 320, the LiDAR 330, the ultrasonic sensor 340 and the infrared sensor 350 may include the processor in an individual manner.

When the processor 370 is not included in the object detecting apparatus 300, the object detecting apparatus 300 may operate based on the control of a processor of an apparatus within the vehicle 100 or the controller 170.

The object detecting apparatus 300 may operate based on the control of the controller 170.

The communication apparatus 400 is an apparatus for performing communication with an external device. Here, the external device may be another vehicle, a mobile terminal or a server computer system.

The communication apparatus 400 may perform the communication by including at least one of a transmitting antenna, a receiving antenna, and radio frequency (RF) circuit and RF device for implementing various communication protocols.

The communication apparatus 400 may include a short-range communication unit 410, a location information unit 420, a V2X communication unit 430, an optical communication unit 440, a broadcast transceiver 450 and a processor 470.

The communication apparatus 400 may further include other components in addition to the components described, or may not include some of the components described.

The short-range communication unit 410 is a unit for facilitating short-range communications. Suitable technologies for implementing such short-range communications include BLUETOOTH™, Radio Frequency IDentification (RFID), Infrared Data Association (IrDA), Ultra-WideBand (UWB), ZigBee, Near Field Communication (NFC), Wireless-Fidelity (Wi-Fi), Wi-Fi Direct, Wireless USB (Wireless Universal Serial Bus), and the like.

The short-range communication unit 410 may construct short-range area networks to perform short-range communication between the vehicle 100 and at least one external device.

The location information unit 420 is a unit for acquiring position information. For example, the location information unit 420 may include a Global Positioning System (GPS) module or a Differential Global Positioning System (DGPS) module.

The V2X communication unit 430 is a unit for performing wireless communications with a server computer system (Vehicle to Infra; V2I), another vehicle (Vehicle to Vehicle; V2V), or a pedestrian (Vehicle to Pedestrian; V2P). The V2X communication unit 430 may include an RF circuit implementing a communication protocol with the infra (V2I), a communication protocol between the vehicles (V2V) and a communication protocol with a pedestrian (V2P).

The optical communication unit 440 is a unit for performing communication with an external device through the medium of light. The optical communication unit 440 may include a light-emitting diode for converting an electric signal into an optical signal and sending the optical signal to the exterior, and a photodiode for converting the received optical signal into an electric signal.

The light-emitting diode may be integrated with lamps provided on the vehicle 100.

The broadcast transceiver 450 is a unit for receiving a broadcast signal from an external broadcast managing entity or transmitting a broadcast signal to the broadcast managing entity via a broadcast channel. The broadcast channel may include a satellite channel, a terrestrial channel, or both. The broadcast signal may include a TV broadcast signal, a radio broadcast signal and a data broadcast signal.

The processor 470 may control an overall operation of each unit of the communication apparatus 400.

The communication apparatus 400 may include a plurality of processors 470 or may not include any processor 470.

When the processor 470 is not included in the communication apparatus 400, the communication apparatus 400 may operate based on the control of a processor of another device within the vehicle 100 or the controller 170.

In this example, the communication apparatus 400 may implement a display apparatus for a vehicle together with the user interface apparatus 200. In this instance, the display apparatus for the vehicle may be referred to as a telematics apparatus or an Audio Video Navigation (AVN) apparatus.

The communication apparatus 400 may operate based on the control of the controller 170.

The driving control apparatus 500 is an apparatus for receiving a user input for driving.

In a manual mode, the vehicle 100 may be operated based on a signal provided by the driving control apparatus 500.

The driving control apparatus 500 may include a steering input device 510, an acceleration input device 530 and a brake input device 570.

The steering input device 510 may receive an input regarding a driving (ongoing) direction of the vehicle 100 from the user. The steering input device 510 is preferably configured in the form of a wheel allowing a steering input in a rotating manner. In some implementations, the steering input device may also be configured in a shape of a touch screen, a touchpad or a button.

The acceleration input device 530 may receive an input for accelerating the vehicle 100 from the user. The brake input device 570 may receive an input for braking the vehicle 100 from the user. Each of the acceleration input device 530 and the brake input device 570 is preferably configured in the form of a pedal. In some implementations, the acceleration input device or the brake input device may also be configured in a shape of a touch screen, a touchpad or a button.

The driving control apparatus 500 may operate based on the control of the controller 170.

The vehicle operating apparatus 600 is an apparatus for electrically controlling operations of various devices within the vehicle 100.

The vehicle operating apparatus 600 may include a power train operating unit 610, a chassis operating unit 620, a door/window operating unit 630, a safety apparatus operating unit 640, a lamp operating unit 650, and an air-conditioner operating unit 660.

In some implementations, the vehicle operating apparatus 600 may further include other components in addition to the components described, or may not include some of the components described.

In this example, the vehicle operating apparatus 600 may include a processor. Each unit of the vehicle operating apparatus 600 may individually include a processor.

The power train operating unit 610 may control an operation of a power train device.

The power train operating unit 610 may include a power source operating portion 611 and a gearbox operating portion 612.

The power source operating portion 611 may perform a control for a power source of the vehicle 100.

For example, upon using a fossil fuel-based engine as the power source, the power source operating portion 611 may perform an electronic control for the engine. Accordingly, an output torque and the like of the engine can be controlled. The power source operating portion 611 may adjust the engine output torque based on the control of the controller 170.

For example, upon using an electric energy-based motor as the power source, the power source operating portion 611 may perform a control for the motor. The power source operating portion 611 may adjust a rotating speed, a torque and the like of the motor based on the control of the controller 170.

The gearbox operating portion 612 may perform a control for a gearbox.

The gearbox operating portion 612 may adjust a state of the gearbox. The gearbox operating portion 612 may change the state of the gearbox into drive (forward) (D), reverse (R), neutral (N) or parking (P).

In this example, when an engine is the power source, the gearbox operating portion 612 may adjust a locked state of a gear in the drive (D) state.

The chassis operating unit 620 may control an operation of a chassis device.

The chassis operating unit 620 may include a steering operating portion 621, a brake operating portion 622 and a suspension operating portion 623.

The steering operating portion 621 may perform an electronic control for a steering apparatus within the vehicle 100. The steering operating portion 621 may change a driving direction of the vehicle.

The brake operating portion 622 may perform an electronic control for a brake apparatus within the vehicle 100. For example, the brake operating portion 622 may control an operation of brakes provided at wheels to reduce speed of the vehicle 100.

In this example, the brake operating portion 622 may individually control each of a plurality of brakes. The brake operating portion 622 may differently control braking force applied to each of a plurality of wheels.

The suspension operating portion 623 may perform an electronic control for a suspension apparatus within the vehicle 100. For example, the suspension operating portion 623 may control the suspension apparatus to reduce vibration of the vehicle 100 when a bump is present on a road.

In this example, the suspension operating portion 623 may individually control each of a plurality of suspensions.

The door/window operating unit 630 may perform an electronic control for a door apparatus or a window apparatus within the vehicle 100.

The door/window operating unit 630 may include a door operating portion 631 and a window operating portion 632.

The door operating portion 631 may perform the control for the door apparatus. The door operating portion 631 may control opening or closing of a plurality of doors of the vehicle 100. The door operating portion 631 may control opening or closing of a trunk or a tail gate. The door operating portion 631 may control opening or closing of a sunroof.

The window operating portion 632 may perform the electronic control for the window apparatus. The window operating portion 632 may control opening or closing of a plurality of windows of the vehicle 100.

The safety apparatus operating unit 640 may perform an electronic control for various safety apparatuses within the vehicle 100.

The safety apparatus operating unit 640 may include an airbag operating portion 641, a seatbelt operating portion 642 and a pedestrian protecting apparatus operating portion 643.

The airbag operating portion 641 may perform an electronic control for an airbag apparatus within the vehicle 100. For example, the airbag operating portion 641 may control the airbag to be deployed upon a detection of a risk.

The seatbelt operating portion 642 may perform an electronic control for a seatbelt apparatus within the vehicle 100. For example, the seatbelt operating portion 642 may control passengers to be motionlessly seated in seats 110FL, 110FR, 110RL, 110RR using seatbelts upon a detection of a risk.

The pedestrian protecting apparatus operating portion 643 may perform an electronic control for a hood lift and a pedestrian airbag. For example, the pedestrian protecting apparatus operating portion 643 may control the hood lift and the pedestrian airbag to be open up upon detecting pedestrian collision.

The lamp operating unit 650 may perform an electronic control for various lamp apparatuses within the vehicle 100.

The air-conditioner operating unit 660 may perform an electronic control for an air conditioner within the vehicle 100. For example, the air-conditioner operating unit 660 may control the air conditioner to supply cold air into the vehicle when internal temperature of the vehicle is high.

The vehicle operating apparatus 600 may include a processor. Each unit of the vehicle operating apparatus 600 may individually include a processor.

The vehicle operating apparatus 600 may operate based on the control of the controller 170.

The operation system 700 is a system that controls various driving modes of the vehicle 100. The operation system 700 may operate in an autonomous driving mode.

The operation system 700 may include a driving system 710, a parking exit system 740 and a parking system 750.

The operation system 700 may further include other components in addition to components to be described, or may not include some of the components to be described.

In this example, the operation system 700 may include a processor. Each unit of the operation system 700 may individually include a processor.

The operation system may be a sub concept of the controller 170 when it is implemented in a software configuration.

In this example, the operation system 700 may be a concept including at least one of the user interface apparatus 200, the object detecting apparatus 300, the communication apparatus 400, the vehicle operating apparatus 600 and the controller 170.

The driving system 710 may perform driving of the vehicle 100.

The driving system 710 may receive navigation information from a navigation system 770, transmit a control signal to the vehicle operating apparatus 600, and perform driving of the vehicle 100.

The driving system 710 may receive object information from the object detecting apparatus 300, transmit a control signal to the vehicle operating apparatus 600 and perform driving of the vehicle 100.

The driving system 710 may receive a signal from an external device through the communication apparatus 400, transmit a control signal to the vehicle operating apparatus 600, and perform driving of the vehicle 100.

The parking exit system 740 may perform an exit of the vehicle 100 from a parking lot.

The parking exit system 740 may receive navigation information from the navigation system 770, transmit a control signal to the vehicle operating apparatus 600, and perform the exit of the vehicle 100 from the parking lot.

The parking exit system 740 may receive object information from the object detecting apparatus 300, transmit a control signal to the vehicle operating apparatus 600 and perform the exit of the vehicle 100 from the parking lot.

The parking exit system 740 may receive a signal from an external device through the communication apparatus 400, transmit a control signal to the vehicle operating apparatus 600, and perform the exit of the vehicle 100 from the parking lot.

The parking system 750 may perform parking of the vehicle 100.

The parking system 750 may receive navigation information from the navigation system 770, transmit a control signal to the vehicle operating apparatus 600, and park the vehicle 100.

The parking system 750 may receive object information from the object detecting apparatus 300, transmit a control signal to the vehicle operating apparatus 600 and park the vehicle 100.

The parking system 750 may receive a signal from an external device through the communication apparatus 400, transmit a control signal to the vehicle operating apparatus 600, and park the vehicle 100.

The navigation system 770 may provide navigation information. The navigation information may include at least one of map information, information regarding a set destination, path information based on the set destination, information regarding various objects on a path, lane information and current location information of the vehicle.

The navigation system 770 may include a memory and a processor. The memory may store the navigation information. The processor may control an operation of the navigation system 770.

The navigation system 770 may update prestored information by receiving information from an external device through the communication apparatus 400.

The navigation system 770 may be classified as a sub component of the user interface apparatus 200.

The sensing unit 120 may sense a status of the vehicle. The sensing unit 120 may include a posture sensor (e.g., a yaw sensor, a roll sensor, a pitch sensor, etc.), a collision sensor, a wheel sensor, a speed sensor, a tilt sensor, a weight-detecting sensor, a heading sensor, a gyro sensor, a position module, a vehicle forward/backward movement sensor, a battery sensor, a fuel sensor, a tire sensor, a steering sensor by a turn of a handle, a vehicle internal temperature sensor, a vehicle internal humidity sensor, an ultrasonic sensor, an illumination sensor, an accelerator position sensor, a brake pedal position sensor, and the like.

The sensing unit 120 may acquire sensing signals with respect to vehicle-related information, such as a posture, a collision, an orientation, a position (GPS information), an angle, a speed, an acceleration, a tilt, a forward/backward movement, a battery, a fuel, tires, lamps, internal temperature, internal humidity, a rotated angle of a steering wheel, external illumination, pressure applied to an accelerator, pressure applied to a brake pedal and the like.

The sensing unit 120 may further include an accelerator sensor, a pressure sensor, an engine speed sensor, an air flow sensor (AFS), an air temperature sensor (ATS), a water temperature sensor (WTS), a throttle position sensor (TPS), a TDC sensor, a crank angle sensor (CAS), and the like.

The interface unit 130 may serve as a path allowing the vehicle 100 to interface with various types of external devices connected thereto. For example, the interface unit 130 may be provided with a port connectable with a mobile terminal, and connected to the mobile terminal through the port. In this instance, the interface unit 130 may exchange data with the mobile terminal.

In this example, the interface unit 130 may serve as a path for supplying electric energy to the connected mobile terminal. When the mobile terminal is electrically connected to the interface unit 130, the interface unit 130 supplies electric energy supplied from a power supply unit 190 to the mobile terminal based on the control of the controller 170.

The memory 140 is electrically connected to the controller 170. The memory 140 may store basic data for units, control data for controlling operations of units and input/output data. The memory 140 may be a variety of storage devices, such as ROM, RAM, EPROM, a flash drive, a hard drive and the like in a hardware configuration. The memory 140 may store various data for overall operations of the vehicle 100, such as programs for processing or controlling the controller 170.

The memory 140 may be integrated with the controller 170 or implemented as a sub component of the controller 170.

The controller 170 may control an overall operation of each unit of the vehicle 100. The controller 170 may be referred to as an Electronic Control Unit (ECU).

The power supply unit 190 may supply power required for an operation of each component based on the control of the controller 170. Specifically, the power supply unit 190 may receive power supplied from an internal battery of the vehicle, and the like.

At least one processor and the controller 170 included in the vehicle 100 may be implemented using at least one of application specific integrated circuits (ASICs), digital signal processors (DSPs), digital signal processing devices (DSPDs), programmable logic devices (PLDs), field programmable gate arrays (FPGAs), processors, controllers, micro controllers, microprocessors, and electric units performing other functions.

The vehicle 100 may operate in one of a manual mode and an autonomous mode. That is, the driving mode of the vehicle 100 may include the manual driving mode and the autonomous driving mode.

The manual driving mode may refer to a mode of driving a vehicle based on a driver's driving manipulation. As one example, in the manual driving mode, a steering of the vehicle may be changed in response to the driver manipulating a steering wheel, and speed (velocity) of the vehicle may be varied by manipulating a brake pedal and an acceleration pedal.

The autonomous driving mode (or automatic driving mode) may refer to a mode in which the vehicle drives by itself based on a preset algorithm, irrespective of a driver's driving manipulation. As one example, the autonomous driving mode may be a mode in which the vehicle drives by itself within a predetermined section or at least part of a section up to a destination set by a user.

In the autonomous driving mode, even though a driver applies a driving manipulation, the vehicle may autonomously move based on a preset algorithm for performing the autonomous driving without varying the steering or speed of the vehicle.

The manual driving mode and the autonomous driving mode belong to the well-known technical field, so detailed description thereof will be omitted.

Hereinafter, description will be given of a vehicle control device and method, which may allow a driver or passenger of a vehicle to intuitively recognize a parking space by providing the parking space (parking area) through augmented reality (AR) information.

In this example, the vehicle 100 may include a vehicle control device 800.

The vehicle control device 800 may control at least one of those components illustrated in FIG. 7. From this perspective, the vehicle control device 800 may be the controller 170.

With no limit to this, the vehicle control device 800 may be a separate component, independent of the controller 170. When the vehicle control device 800 is implemented as a component independent of the controller 170, the vehicle control device 800 may be provided in a part of the vehicle 100.

Hereinafter, for the sake of explanation, the vehicle control device 800 will be described as a separate component, independent of the controller 170. In this specification, functions and a control method of the vehicle control device 800 may be performed by the controller 170 of the vehicle. That is, every description in relation to the vehicle control device 800 will also be applied equally/similarly to the controller 170.

Also, the vehicle control device 800 disclosed in this specification may include some of the components illustrated in FIG. 7 and various components provided in the vehicle. In this specification, for the sake of explanation, separate names and reference numerals will be given to those components illustrated in FIG. 7 and the various components provided in the vehicle.

Figure 8:
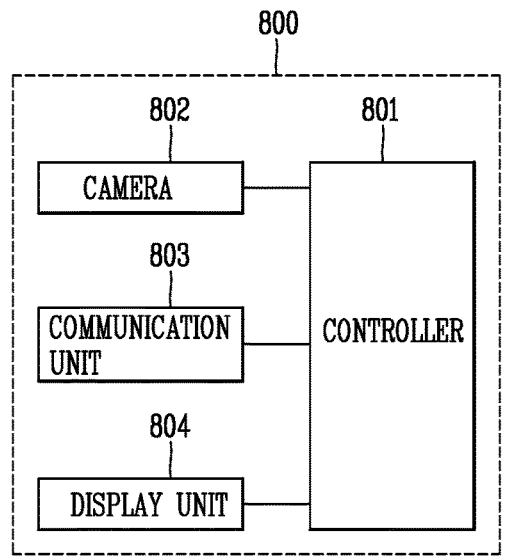
FIG. 8 is a diagram illustrating an example vehicle control device.

FIG. 8 illustrates an example vehicle control device. The vehicle control device 800 may include a controller 801, a camera 802, a communication unit 803, a display unit 804, and the like. The controller 801 may be the controller 170 illustrated in FIG. 7.

The controller 801 may control those components illustrated in FIG. 7 and components to be explained in FIG. 8.

The communication unit 803 may be the aforementioned communication apparatus 400. The communication unit 803 may be connected to an external server computer system of the vehicle 100 to allow communication therebetween.

The vehicle control device 800 (or the vehicle 100) and a mobile terminal can be connected to perform wireless communication through the communication unit 803. The vehicle control device 800 and the mobile terminal can be wirelessly connected to each other to perform wireless communication based on a user request.

The communication unit 803 may be provided in a vehicle (or the vehicle control device), or configured in a form of a separate module to perform communication (or be electrically connected to) the components of the vehicle.

The camera 802 may be arranged on the vehicle to capture an outside image of the vehicle 100. The camera 802 may be a camera installed on the vehicle 100.

The controller 801 outputs a real-time image received by the camera 802 on the display unit 804. In some implementations, the controller 801 outputs a preview image received by the camera 802. The controller 801 detects, from the real-time image), a virtual parking-available space that corresponds to an actual parking-available space at an area in the output image. For example, virtual parking-available space can be tagged on the image. The controller 801 generates parking space information based on the virtual parking-available space and outputs one image (AR information) in a manner of overlaying the parking space information with the output real-time image.

The display unit 804 may include at least one of a liquid crystal display (LCD), a thin film transistor-LCD (TFT LCD), an organic light-emitting diode (OLED), a flexible display, a three-dimensional (3D) display and an e-ink display.

The display unit 804 may be inter-layered or integrated with a touch input module 213 to implement a touch screen.

The display unit 804 may be implemented as a head up display (HUD). When the display unit 804 is implemented as the HUD, the display unit 804 may be provided with a projecting module so as to output information through an image which is projected on a windshield or a window.

The display unit 804 may include a transparent display. The transparent display may be attached on the windshield or the window.

The transparent display may have a predetermined degree of transparency and output a predetermined screen thereon. The transparent display may include at least one of a thin film electroluminescent (TFEL), a transparent OLED, a transparent LCD, a transmissive transparent display and a transparent LED display. The transparent display may have adjustable transparency.

Hereinafter, description will be given of a vehicle control method, which may allow a driver or passenger of a vehicle can intuitively recognize a parking space by providing the parking space (parking area) through augmented reality (AR) information, with reference to FIGS. 9 and 10.

Figure 9:
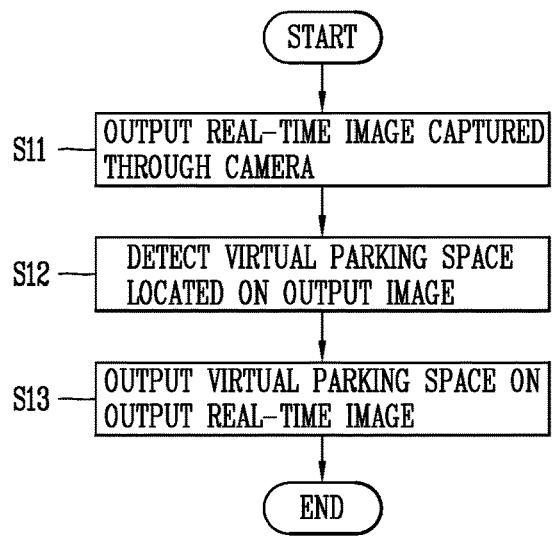
FIG. 9 is a flowchart illustrating an example method for operating an example vehicle control device.

FIG. 9 illustrates an example method for operating an example vehicle control device.

The controller 801 captures an outside image of the vehicle in real time through the camera 802, and outputs the captured real-time image on the display unit 804 (S11). The display unit 804 may be applied to an HUD, a center information display (CID), a windshield or a window of the vehicle.

As one example, when a parking search mode (e.g., icon, button, image, etc.) to search for a virtual parking-available space (virtual parking-available space) preset based on AR information is selected, the controller 801 controls the camera 802 to capture an outside image of the vehicle in real time and controls the display unit 804 to output the captured real-time image.

As another example, when a driver request (e.g., voice command, gesture, touch input, etc.) to search for a virtual parking-available space (virtual parking-available space) preset based on AR information is received, the controller 801 controls the camera 802 to capture an outside image of the vehicle in real time, and controls the display unit 804 to output the captured real-time image.

As another example, when the vehicle arrives near a destination, the controller 801 automatically selects a parking search mode (e.g., icon, button, image, etc.) to search for a virtual parking-available space preset based on AR information, controls the camera 802 to capture an outside image of the vehicle in real time, and controls the display unit 804 to output the captured real-time image.

The controller 801 then detects a preset virtual parking-available space located on the real-time output image at the same time of outputting the real-time image captured through the camera 802 on the display unit 804 (S12).

As one example, when the parking search mode (e.g., icon, button, image, etc.) to search for the virtual parking-available space (virtual parking-available space) preset based on the AR information is selected, the controller 801 controls the camera 802 to capture an outside image of the vehicle in real time, and detects a virtual parking-available space (parking lines) preset in coordinates information corresponding to the real-time image. For example, the controller 801 may detect the virtual parking-available space (parking lines) preset in the coordinates information corresponding to the real-time image from a server computer system or the memory 140.

As another example, when a driver request (e.g., voice command, gesture, touch input, etc.) to search for the virtual parking-available space preset based on the AR information is received, the controller 801 controls the camera 802 to capture an outside image of the vehicle in real time, and detects a virtual parking-available space (parking lines) preset in coordinates information corresponding to the captured real-time image from the server computer system or the memory 140.

As another example, when the vehicle arrives near a destination, the controller 801 automatically selects the parking search mode (e.g., icon, button, image, etc.) to search for the virtual parking-available space preset based on the AR information, controls the camera 802 to capture an outside image of the vehicle in real time, and detects a virtual parking-available space (parking lines) preset in coordinates information corresponding to the captured real-time image from the server computer system or the memory 140.

As another example, when the vehicle drives at a predetermined speed (e.g., 20~30 Km/h) or less, the controller 801 automatically selects the parking search mode (e.g., icon, button, image, etc.) to search for the virtual parking-available space preset based on the AR information, controls the camera 802 to capture an outside image of the vehicle in real time, and detects a virtual parking-available space (parking lines) preset in coordinates information corresponding to the captured real-time image from the server computer system or the memory 140.

As another example, when the vehicle arrives near a destination, the controller 801 automatically selects the parking search mode (e.g., icon, button, image, etc.) to search for the virtual parking-available space preset based on the AR information, controls the camera 802 to capture an outside image of the vehicle in real time, and detects a virtual parking-available space, which is located in a driving direction of the vehicle within a virtual parking-available space (parking lines) preset in coordinates information corresponding to the captured real-time image, from the server computer system or the memory 140. For example, the controller 801 detects only a parking-available space located at the right of a currently-driving road of the vehicle, other than a parking-available space located at the left of the currently-driving road of the vehicle, from the server computer system or the memory 140, and matches the detected parking-available space with the real-time image for output.

As another example, when a point A (e.g., Los Angeles) is selected within a map output on the display unit 804, the controller 801 may detect a parking space required for the cheapest parking fee within the selected point A from the server computer system or the memory 140, and guide the searched parking space.

The controller 801 outputs information related to the detected virtual parking-available space on the display unit 804 (S13). For example, the controller 801 captures an outside image of the vehicle in real time through the camera 802, detects a virtual parking-available space (parking lines) preset in coordinates information corresponding to the captured real-time image from the server computer system or the memory 140, and overlaps the detected preset virtual parking-available space (parking lines) with the captured real-time image into one image so as to output the one image.

Figure 10:
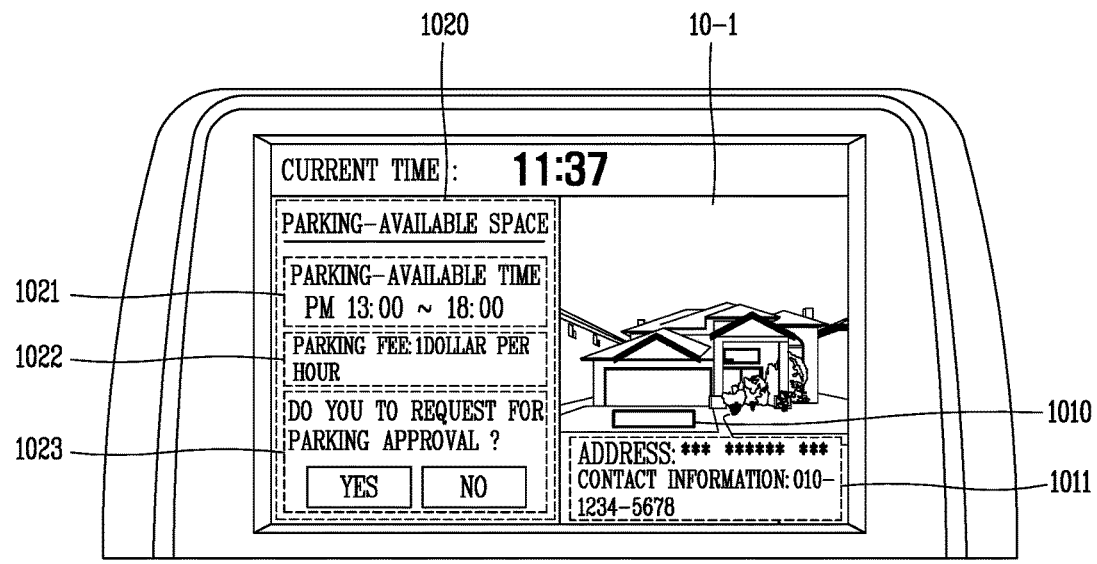
FIG. 10 is a diagram illustrating example graphic user interface representing an example virtual parking-available space parking-available space and example virtual parking-available space information.

FIG. 10 illustrates an example graphic user interface representing an example virtual parking-available space and example virtual parking-available space information. As illustrated in FIG. 10, the controller 801 captures an outside image 10-1 of the vehicle in real time through the camera 802, and outputs the captured real-time image 10-1 on the display unit 804. For example, when a parking search mode (e.g., icon, button, image, etc.) is selected to search a virtual parking-available space or virtual parking-available space information through AR information, the controller 801 captures the outside image 10-1 of the vehicle in real time by the camera 802, and outputs the captured real-time image 10-1 on the display unit 804.

The controller 801 detects, from the captured real-time image 10-1, a virtual parking-available space that corresponds to an actual parking-available space in an area in the outside image 10-1. For example, the virtual parking-available space can be tagged in the outside image 10-1. Based on the virtual parking-available space, the controller 801 generates parking space information, e.g., virtual parking lines. The controller 801 provides the parking space information to the display. The parking space information that is overlaid over the outside image 10-1 presented on the display. In some implementations, the virtual parking-available space can be preset by an owner of the actual parking-available space. The controller 180 may also obtain, from the server computer system or the memory 140 of the control device, other parking space information 1020 related to the preset virtual parking-available space as well as the parking line 1010.

In some implementations, the parking space information includes parking line 1010. In some other implementations, the parking space information includes parking line 1010 and other parking space information 1020. Other parking space information 1020 may include an address or a coordinate, owner contact information 1011 to contact the owner of the property corresponding to the preset virtual parking-available space, a parking-available time 1021 (e.g., 1:00 p.m.~6:00 p.m.), a parking fee 1022 (e.g., 1 dollar per hour), or a parking request approval message 1023 that is sent to the owner of the property corresponding to the preset virtual parking-available space (e.g., "Do you want to request parking approval?), all related to the preset virtual parking-available space 1010.

When the vehicle 100 is located in the virtual parking line 1010 output on the display unit 804, the controller 801 may output at least one of the address (or coordinates), the owner contact information 1011, the parking-available time 1021 (e.g., PM 13:00~18:00), the parking fee 1022 (e.g., 1 dollar per hour) and the parking request approval message 1023 (e.g., Do you want to request a parking approval?), with respect to the preset virtual parking-available space 1010. The parking-available time 1021 (e.g., PM 13:00~18:00), the parking fee 1022 (e.g., 1 dollar per hour) and the like for the preset parking space 1010 may be preset in the server computer system by the owner of the parking space.

When the vehicle 100 is located in the parking line 1010 output on the display unit 804, the controller 801 may output on the display unit 804 the parking-available time 1021 (e.g., PM 13:00~18:00), the parking fee 1022 (e.g., 1 dollar per hour) and the parking request approval message 1023 (e.g., Do you want to request parking approval?), with respect to the preset parking space 1010. The controller 801 may then transmit the parking request approval message 1023 (e.g., Do you want to request parking approval?) to the owner of the parking space 1010 through the server computer system based on a driver's request. Afterwards, upon receiving the parking approval message from the owner, the controller 801 may determine that the owner has allowed the parking at the preset parking space 1010, and pay for the parking fee 1022 or pay for the parking fee 1022 when exiting the parking space 1010.

The server computer system provides or does not provide the parking space 1010 preset through the AR information by detecting whether the preset parking space 1010 is currently used. For example, when the preset parking space 1010 is currently used, the server computer system does not provide the preset parking space 1010 to another vehicle. On the other hand, when the preset parking space 1010 is currently not used, the server computer system provides the preset parking space (parking-available space) 1010 to another vehicle.

Hereinafter, description will be given of a method of recognizing whether the vehicle 100 has actually been parked at the preset parking space 1010 (a method of detecting whether the preset parking space 1010 is currently used).

Figure 11:
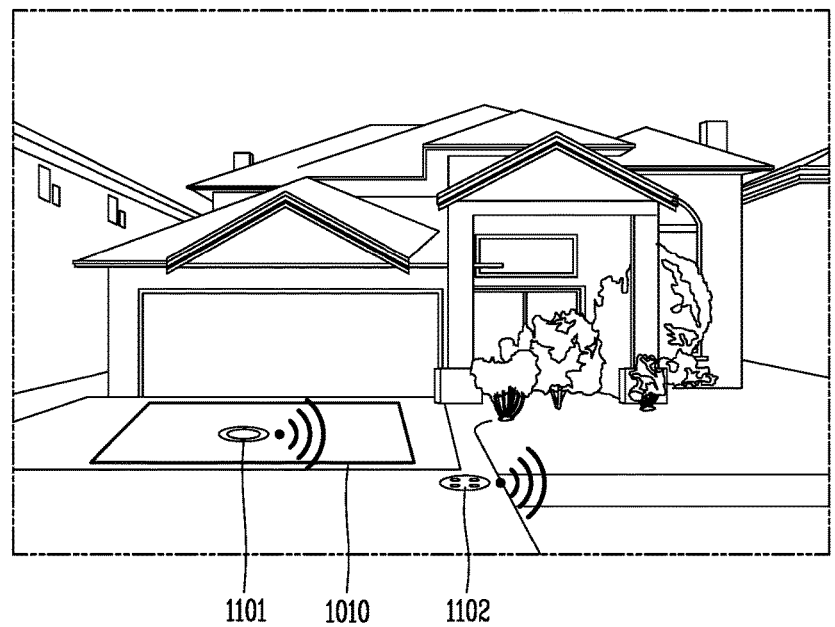
FIG. 11 is a diagram illustrating an example method of detecting whether a vehicle is parked at an actual parking-available space corresponding to a virtual parking-available space.

FIG. 11 illustrates an example method for detecting whether a vehicle is parked at an actual parking-available space corresponding to a virtual parking-available space.

The controller 801 may decide whether the vehicle 100 has entered the virtual parking-available space (virtual parking line) 1010 on the basis of a global positioning system (GPS) signal of a GPS module. When the vehicle 100 has entered the virtual parking-available space (virtual parking line) 1010, the controller 801 may notify to the server computer system and the owner (terminal of the parking space owner) that the vehicle 100 has been parked at the virtual parking-available space 1010.

As illustrated in FIG. 11, when the vehicle enters the actual parking-available space corresponding to the virtual parking-available space (virtual parking line) 1010, the controller 801 may receive a vehicle detection (sensing) signal from a parking sensor 1101 which is actually located in the virtual parking-available space 1010, and notify to the server computer system and the owner (the terminal of the parking space owner) that the vehicle 100 has been parked at the virtual parking-available space 1010 based on the received vehicle detection signal.

When the vehicle 100 enters the actual parking-available space corresponding to the virtual parking-available space (virtual parking line) 1010, the controller 801 may receive a vehicle detection signal from a beacon 1102, which is actually located at the actual parking-available space corresponding to virtual parking-available space 1010, and notify to the server computer system and the owner of the actual parking-available space that the vehicle 100 has been parked at the actual parking-available space corresponding to the virtual parking-available space 1010 on the basis of the received vehicle detection signal.

As another example, when the virtual parking-available space is defined by a plurality of virtual parking lines and the vehicle 100 occupies two parking lines, a parking sensor 1101 and a beacon 1102 request a server computer system or owner to change the two parking lines into one virtual parking line, and the server computer system or owner changes the two virtual parking lines into the one virtual parking line. The server computer system transmits information related to the changed one virtual parking line to the vehicle 100, and the vehicle 100 changes the two virtual lines into the one virtual parking line and displays the changed one virtual parking line.

The parking sensor 1101 and the beacon 1102 may transmit the vehicle detection signal to the server computer system through one or more networks.

Figure 12:
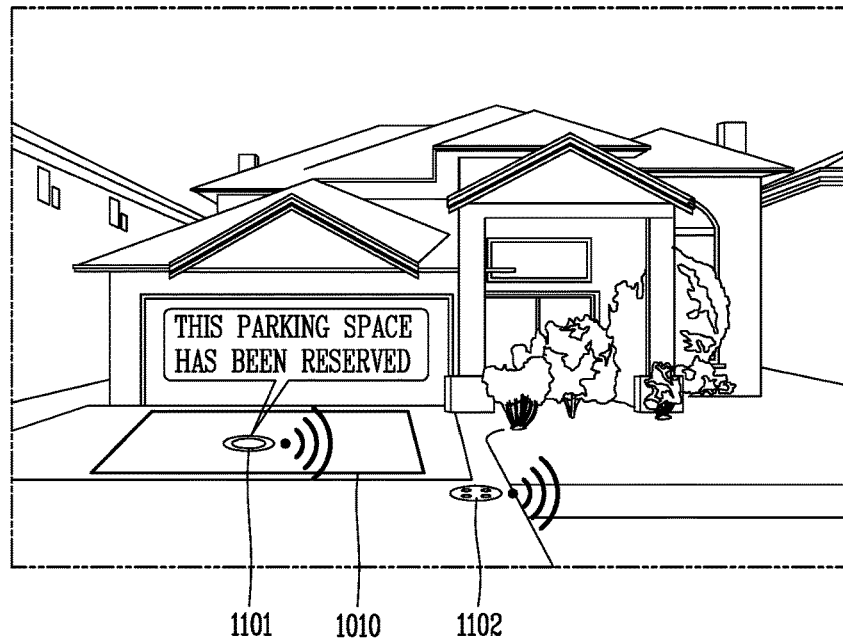
FIG. 12 is a diagram illustrating an example method of detecting whether an authorized vehicle is parked at an actual parking-available space corresponding to a virtual parking-available space.

FIG. 12 illustrates an example method of detecting whether an authorized vehicle is parked at an the actual parking-available space corresponding to a virtual parking-available space. The unauthorized vehicle represents a vehicle that is not allowed or not registered to park in the actual parking-available space corresponding to a virtual parking-available space.

As illustrated in FIG. 12, when the vehicle enters the actual parking-available space corresponding to the virtual parking-available space (virtual parking line) 1010, the parking sensor 1101 decides whether the vehicle is an authorized or reserved vehicle. When the vehicle entered the actual parking-available space corresponding to the virtual parking-available space (virtual parking line 1010) is an unauthorized or unreserved vehicle, the parking sensor 1101 provides a warning notification (e.g., this space is a reserved parking space). For example, the parking sensor 1101 may further include an audio output module. When the unauthorized or unreserved vehicle enters the actual parking-available space corresponding to the virtual parking-available space (virtual parking line) 1010, the parking sensor 1101 may output the warning notification (e.g., This parking space is a reserved parking space) through the audio output module.

The parking sensor 1101 may further include a communication module. When the unauthorized or unreserved vehicle enters the actual parking-available space corresponding to the virtual parking-available space (virtual parking line) 1010, the parking sensor 1101 may also transmit the warning notification (e.g., This parking space is a reserved parking space) through the communication module to the unauthorized or unreserved vehicle. The unauthorized or unreserved vehicle (controller) outputs the warning notification (e.g., This parking space is a reserved parking space) through a display module and/or audio output module.

As another example, when the vehicle enters the actual parking-available space corresponding to the virtual parking-available space (virtual parking line) 1010, the beacon 1102 may decide whether the vehicle is an authorized or reserved vehicle, and provide a warning notification (e.g., This parking space is a reserved parking space) when the vehicle entered in the virtual parking-available space (virtual parking line) 1010 is an unauthorized or unreserved vehicle. For example, the beacon 1102 may further include an audio output module. When the unauthorized or unreserved vehicle enters the actual parking-available space corresponding to the virtual parking-available space (virtual parking line) 1010, the beacon 1102 may output the warning notification (e.g., This parking space is a reserved parking space) through the audio output module.

The beacon 1102 may further include a communication module. When the unauthorized or unreserved vehicle enters the actual parking-available space corresponding to the virtual parking-available space (virtual parking line) 1010, the beacon 1102 may also transmit the warning notification (e.g., This parking space is a reserved parking space) to the unauthorized or unreserved vehicle through the communication module. The unauthorized or unreserved vehicle (controller) outputs the warning notification (e.g., This parking space is a reserved parking space) through a display module and/or audio output module.

That is, when the vehicle enters the actual parking-available space corresponding to the virtual parking-available space 1010, the controller 801 receives a notification signal notifying whether the vehicle 100 is an authorized or reserved vehicle from the parking sensor 1101 or the beacon 1102, and outputs the notification signal on the display unit 804.

Figure 13:
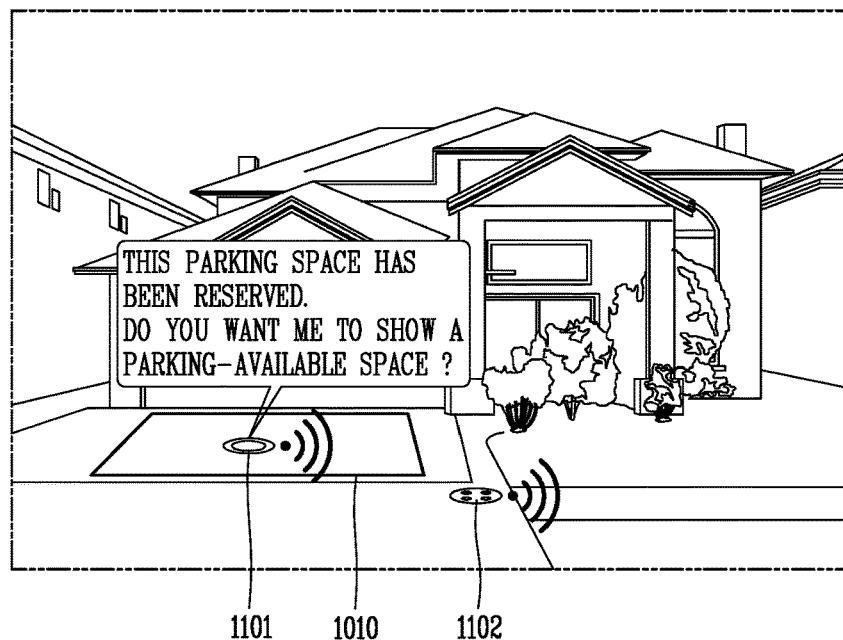
FIG. 13 is a diagram illustrating an example method of guiding a vehicle to other parking-available spaces.

FIG. 13 illustrates an example method of guiding a vehicle to other parking-available spaces. As illustrated in FIG. 13, when the vehicle enters the actual parking-available space corresponding to the virtual parking-available space (virtual parking line) 1010, the parking sensor 1101 decides whether the vehicle is an authorized or reserved vehicle. When the vehicle entered in the virtual parking-available space (virtual parking line) 1010 is an unauthorized or unreserved vehicle, the parking sensor 1101 provides a warning notification (e.g., This parking space is a reserved parking space), searches for another available parking space, and provides the searched another available parking space to the vehicle 100. For example, when the unauthorized or unreserved vehicle enters the actual parking-available space corresponding to the virtual parking-available space (virtual parking line) 1010, the parking sensor 1101 outputs the warning notification (e.g., This parking space is a reserved parking space) through the audio output module, and provides the searched available parking space to the vehicle (controller 801) through a communication network. The controller 801 receives the searched another available parking space from the parking sensor 1101 through the communication network, and outputs the received searched another available parking space on the display module 804.

As another example, when the vehicle enters the actual parking-available space corresponding to the virtual parking-available space (virtual parking line) 1010, the beacon 1102 decides whether the vehicle is an authorized or reserved vehicle. When the vehicle enters the actual parking-available space corresponding to the virtual parking-available space (virtual parking line) 1010 is an unauthorized or unreserved vehicle, the beacon 1102 provides a warning notification (e.g., This parking space is a reserved parking space), searches for another available parking space, and provides the searched another available parking space to the vehicle 100. For example, when the unauthorized or unreserved vehicle enters the actual parking-available space corresponding to the virtual parking-available space (virtual parking line) 1010, the beacon 1102 outputs the warning notification (e.g., This parking space is a reserved parking space) through the audio output module, and provides the searched available parking space to the vehicle (controller 801) through a communication network. The controller 801 receives the searched another available parking space from the beacon 1102 through the communication network, and outputs the received searched another available parking space on the display module 804.

That is, after receiving the notification signal notifying whether the vehicle 100 is the unauthorized or unreserved vehicle from the parking sensor 1101 or the beacon 1102, the controller 801 receives the searched another available parking space, and outputs the received searched another available parking space on the display unit 804. The parking sensor 1101 or the beacon 1102 may also be referred to as a parking position detecting sensor.

When the notification signal notifying that the vehicle 100 is the unauthorized or unreserved vehicle is received from the parking position detecting sensor, the controller 801 may search for a virtual parking-available space near a current position of the vehicle from the server computer system or memory. The controller 801 can provide navigation information to the actual parking-available space corresponding to the searched virtual parking-available space to the display unit 804.

The controller 801 automatically generates a notification message after a lapse of the parking-available time, and guides the generated notification message to a driver or owner. For example, after the lapse of the parking-available time, the controller 801 automatically generates a notification message (e.g., The parking-available time has elapsed), and outputs the generated notification message through the display unit 804 and the audio output module 252. The controller 801 also transmits the generated notification message even to a mobile terminal of the owner.

The controller 801 periodically detects the owner's position before the parking-available time starts, and outputs the detected owner's position through the display unit 804 and the audio output module 252. For example, the controller 801 periodically detects the owner's position (a position of a vehicle or mobile terminal of the owner) 10 to 30 minutes before the parking-available time starts, and guides the detected position of the owner to the driver of the vehicle 100.

When a predetermined time (e.g., 10 minutes) elapses or an engine of the vehicle 100 is stopped after the vehicle enters the actual parking-available space corresponding to the virtual parking-available space (virtual parking line) 1010, the controller 801 automatically pays for the parking fee for the virtual parking-available space (virtual parking line) 1010.

Figure 14:
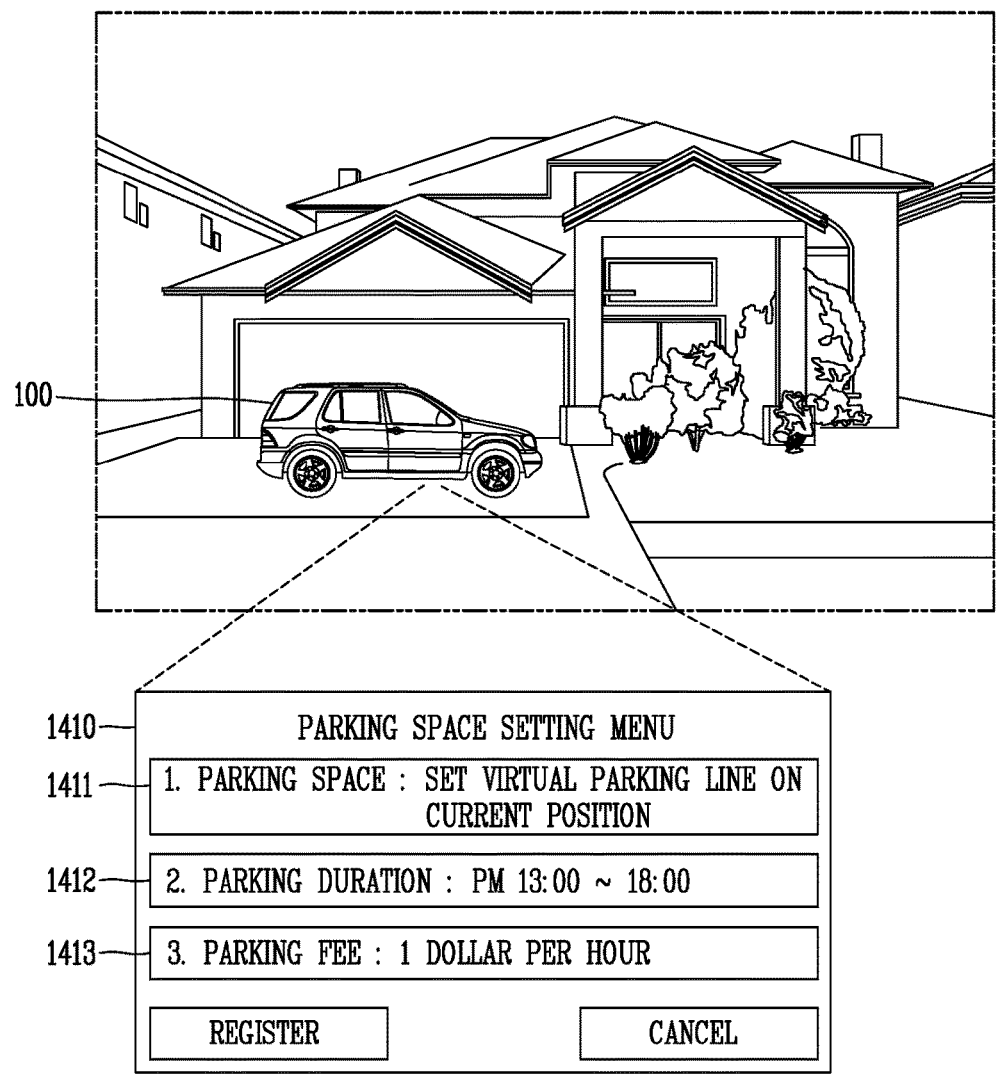
FIG. 14 is a diagram illustrating an example method of setting a virtual parking-available space.

FIG. 14 illustrates an example method of setting a virtual parking-available space. With reference to FIG. 14, a method that an owner possessing the actual parking-available space corresponding to the virtual parking-available space 1010 lends the actual parking-available space using AR information is described. The virtual parking-available space 1010 is output on the same position as a real parking space. A virtual parking line is set on the position (coordinates) of the real parking space using AR information, and this set virtual parking line is registered in a server computer system.

The controller 801 may also set the virtual parking line and register the set virtual parking line and information related to the virtual parking line (e.g., parking-available time, parking fee, etc.) in the server computer system.

As illustrated in FIG. 14, the controller 801 outputs a parking space setting menu 1410 on the display unit 804 based on a user request. When the parking space setting menu 1410 is selected, the controller 801 outputs on the display unit 804 a first item 1411 for receiving information regarding a parking-available space, a second item 1412 for receiving information regarding a parking duration with respect to the parking-available space, a third item 1413 for receiving information regarding a parking fee for the parking-available space, and the like.

The controller 801 may automatically input a parking-available position (current position, parked position) of the vehicle 100 as a parking-available space in the first item 1411 based on a user selection (request). The controller 801 sets (tags) a virtual parking line on the parking-available position (current position) based on the user selection (request). That is, the controller 801 registers the current position (parking position) of the vehicle as the parking-available space in the server computer system.

The controller 801 may also input coordinates (position information) input by the user as the parking-available space in the first item 1411. That is, the controller 801 sets (tags) the virtual parking line on the coordinates (position information) input by the user.

The controller 801 inputs a parking duration with respect to the parking-available space in the second item 1412 on the basis of a user input, and inputs a parking fee for the parking-available space in the third item 1413.

The controller 801 registers in the server computer system the parking-available space input in the first item 1411, the parking duration input in the second item 1412, the parking fee input in the third item 1413, and the like.

That is, the controller 801 receives a parking-available position of the vehicle, a parking-available time for the parking-available position and a parking fee for the parking-available position. Then the controller 801 transmits information about the received parking-available position, parking-available time, and parking fee to a particular vehicle through one or more networks. For example, the controller 801 can send the information to an adjacent vehicle.

A specific vehicle requests for a parking-available space located (tagged) on an image captured in real time by the camera from the server computer system, receives the parking-available space input in the first item 1411 from the server computer system, and outputs a virtual parking line corresponding to the received parking-available space on the image in an overlapping manner. The specific vehicle automatically performs autonomous parking or manual parking when the output virtual parking line is selected.

When the output virtual parking line is selected, the specific vehicle requests for the parking duration input in the second item 1412 and the parking fee input in the third item 1413 from the server computer system, and receives and outputs the requested parking duration, parking fee and the like. The specific vehicle outputs the parking duration input in the second item 1412 and the parking fee input in the third item 1413 on the display unit, and immediately pays for the parking fee.

The specific vehicle may alternatively output the parking duration input in the second item 1412 and the parking fee input in the third item 1413 on the display unit and then pay for the parking fee when exiting the parking space.

The specific vehicle may output at least one of an address (coordinates), owner contact information, a parking-available time (e.g., PM 13:00~18:00), a parking fee (e.g., one dollar per hour), and a parking request approval message (e.g., Do you want to request parking approval?), with respect to the parking-available space.

The specific vehicle may transmit the parking request approval message (e.g., Do you want to request parking approval?) to the owner of the parking space through the server computer system based on the driver's request. When a parking approval message is received from the owner, the specific vehicle determines that the owner has approved the parking at the parking space, and pays for the parking fee immediately or when exiting the parking space.

Figure 15:
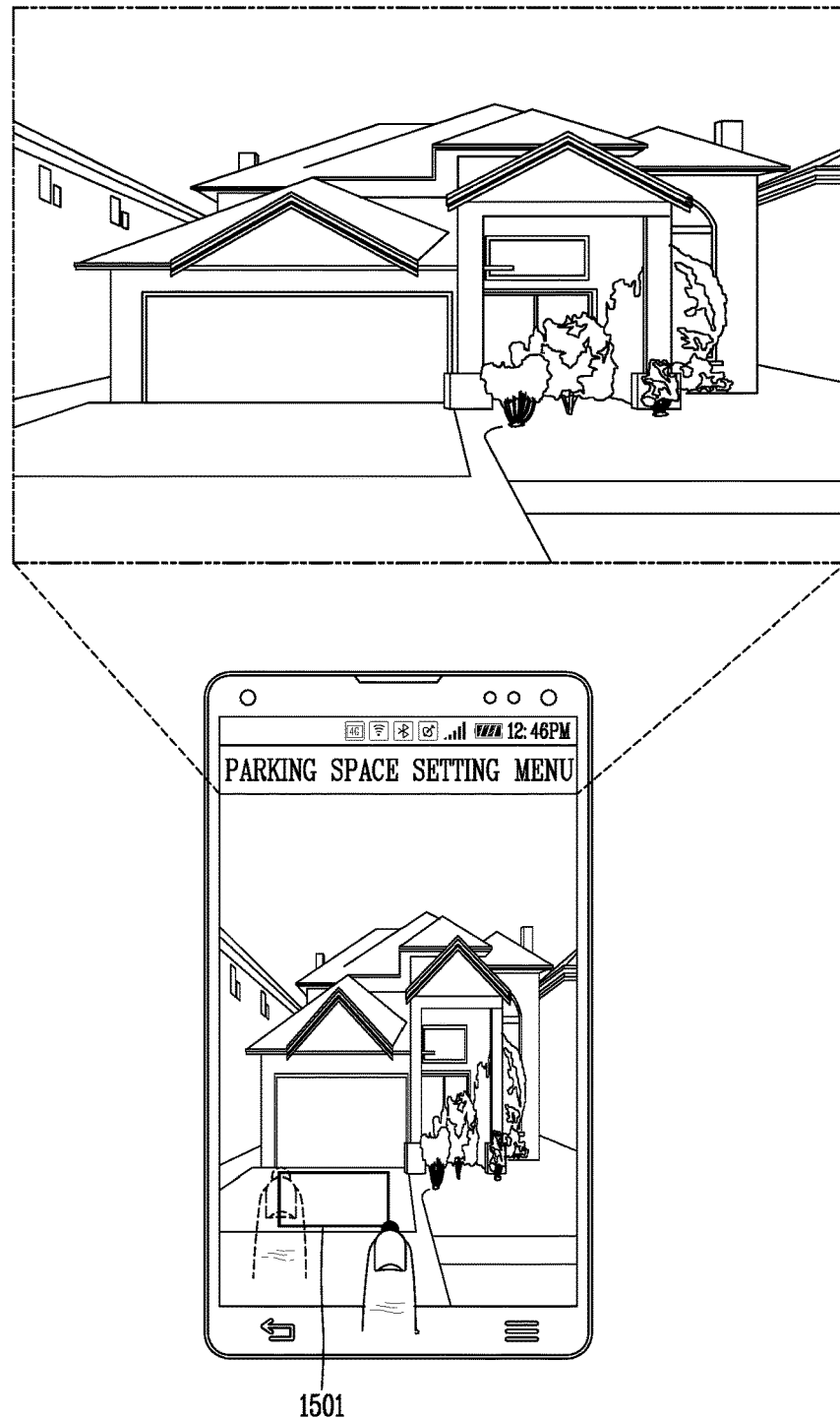
FIG. 15 is a diagram illustrating another example method of setting a virtual parking-available space.

FIG. 15 illustrates another example method of setting a virtual parking-available space. With reference to FIGS. 14 and 15, a method that the owner possessing the actual parking-available space corresponding to the virtual parking-available space 1010 sets the virtual parking-available space 1010 using AR information is described. The virtual parking-available space 1010 is output on the same position as a position of a real parking-available space. Virtual parking information, e.g., a virtual parking line, is set on the position (coordinates) of the real parking space using AR information, and this set virtual parking line is registered in the server computer system. The controller 801 may set the virtual parking line and register the set parking line and information related to the parking line (e.g., parking duration, parking fee, etc.) in the server computer system.

As illustrated in FIGS. 14 and 15, the controller 801 outputs a parking space setting menu 1410 on the display unit 804 based on a user request. When the parking space setting menu 1410 is selected, the controller 801 outputs on the display unit 804 a first item 1411 for receiving information regarding a parking-available space, a second item 1412 for receiving information regarding a parking duration with respect to the parking-available space, a third item 1413 for receiving information regarding a parking fee for the parking-available space, and the like.

In the selected state of the parking space setting menu 1410, the controller 801 captures a preview image using the camera 802, in response to the selection of the first item 1411 or based on a user request, and then outputs the preview image on the display unit 804.

The controller 801 may automatically input a position corresponding to a specific object as the parking-available space in the first item 1411 when a touch input (drag & drop input) 1501 is applied to the specific object within the preview image. For example, when the user draws (selects) a desired area on the preview image in a dragging manner, the controller 801 may input the desired area (position) as the parking-available space in the first item 1411.

When a touch input is applied to the specific object within the preview image, the controller 801 may output an area image that is overlaid over the specific object. In some implementations, the area image can have a preset size. For example, the area image of the preset size may be a parking line.

The controller 801 may register in the server computer system coordinate values input in the first item 1411 as the parking-available space.

The controller 801 may also output on the display unit 804 a fourth item for receiving information regarding a vehicle type to be parked at the parking-available space, in addition to the first item 1411 for receiving information regarding the parking-available space, the second item 1412 for receiving information regarding the parking duration and the third item 1413 for receiving information regarding the parking fee. For example, the parking space owner may input the vehicle type in the fourth item to allow only a vehicle desired by the owner to be parked at the parking-available space. That is, the parking space owner may input only a small vehicle, except for a truck, a bus and the like, in the fourth item.

The controller 801 registers in the server computer system the parking-available space input in the first item 1411, the parking duration input in the second item 1412, the parking fee input in the third item 1413, the vehicle type input in the fourth item and the like.

The controller 801 may register in the server computer system the vehicle type, a vehicle size, a parking-reservable time and the like, which are input in the fourth item, in addition to the parking-available space input in the first item 1411, the parking duration input in the second item 1412 and the parking fee input in the third item 1413, thereby filtering vehicles to be parked in the parking-available space.

Hereinafter, a parking method by selecting a plurality of parking-available spaces 1010 will be described with reference to FIG. 16.

Figure 16:
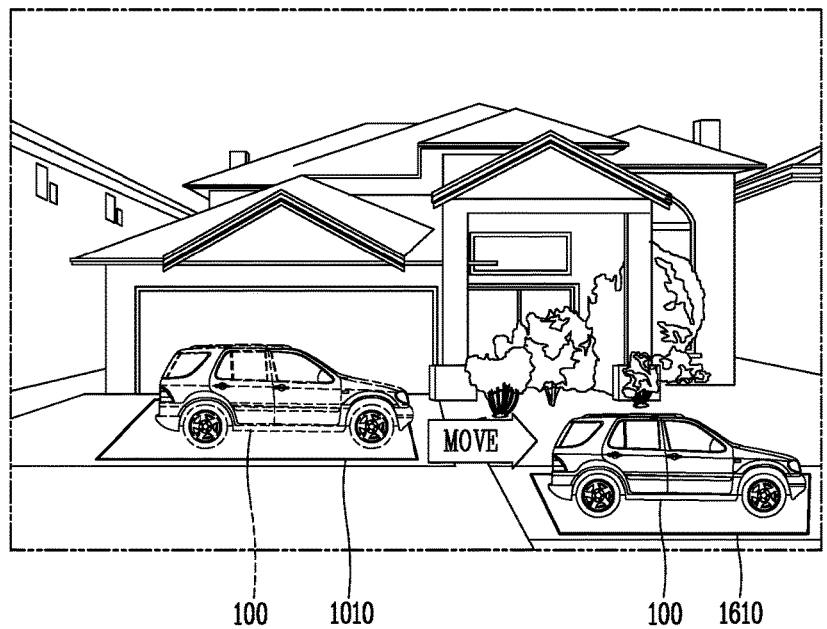
FIG. 16 is a diagram illustrating an example of multiple virtual parking-available spaces.

FIG. 16 illustrates example multiple virtual parking-available spaces. As illustrated in FIG. 16, when one of the multiple parking-available spaces 1010 and 1610 output on an image captured in real time by the camera 802 is selected, the controller 801 transmits a reservation request for the selected one parking-available space 1010 to the server computer system. When a reservation approval message for the reservation request is received from the server computer system, the controller 801 stores the selected one parking-available space 1010 in a parking-expected space.

When a first parking-available space 1010 and a second parking-available space 1610 are selected from the multiple parking-available spaces output on the image captured in real time by the camera 802, the controller 801 transmits a reservation request for the selected first parking-available space 1010 and second parking-available space 1610 to the server computer system. When a reservation approval message for the reservation request is received from the server, the controller 801 stores the selected first parking-available space 1010 and second parking-available space 1610 as parking-expected spaces. For example, if it is assumed that a parking time required by the vehicle 100 is 2 hours, a parking-available time of the first parking-available space 1010 is from 1:00 PM to 2:00 PM and a parking-available time of the second parking-available space 1610 is from 2:00 PM to 3:00 PM, the controller 801 automatically selects the first parking-available space 1010 and the second parking-available space 1610 from the multiple parking-available spaces output on the image captured in real time by the camera 802, and performs a reservation request for the selected first and second parking-available spaces 1010 and 1610.

The controller 801 autonomously parks the vehicle 100 until 2:00 PM at the first parking-available space 1010. The controller 801 then autonomously parks the vehicle 100 at the second parking-available space 1610 after autonomously moving the vehicle 100 to the second parking-available space 1610.

Hereinafter, description will be given of a method of recommending a plurality of parking-available spaces output on an image captured in real time by the camera 802 based on priorities, with reference to FIG. 17.

Figure 17:
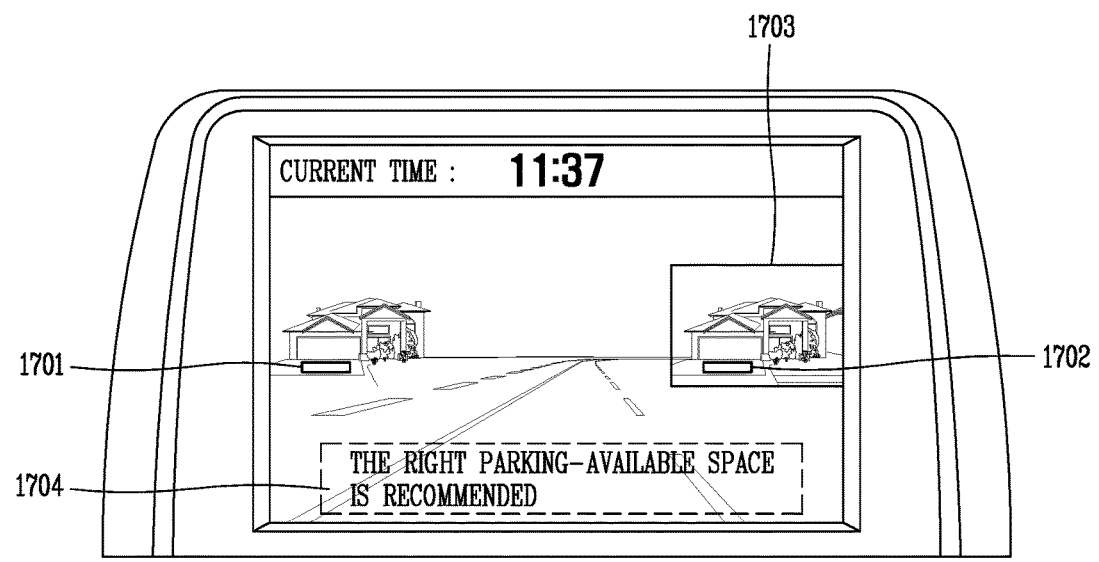
FIG. 17 is a diagram illustrating an example method of providing multiple virtual parking-available spaces based on priorities.

FIG. 17 illustrates an example method of providing multiple virtual parking-available spaces based on priorities. As illustrated in FIG. 17, the controller 801 detects a plurality of parking-available spaces including first parking-available space 1701 and second parking-available space 1702 output on an image captured in real time by the camera 802, outputs the detected plurality of parking-available spaces on the display unit 804, and differently outputs the multiple parking-available spaces based on preset priorities. The priority may include at least one of a parking fee, a driving direction of the vehicle (degree of proximity to vehicle), a parking-available time, and the like.

For example, the controller 801 may differently output colors, sizes, indications and the like of the detected plurality of parking-available spaces based on a preset priority. The controller 801 outputs the second parking-available space 1702 corresponding to the preset priority to be different from the other parking-available space 1701 of the detected plurality of parking-available spaces.

For example, the controller 801 selects the second parking-available space 1702, which is the closest to the driving direction of the vehicle, from the first parking-available space 1701 and the second parking-available space 1702 existing at both sides of a road, and recommends the selected second parking-available space 1702 to the driver. The controller 801 selects the second parking-available space 1702, which is the closest to the driving direction of the vehicle, from the first parking-available space 1701 and the second parking-available space 1702 existing at both sides of the road, generates a notification message 1704 notifying that the selected second parking-available space 1702 is recommended, and outputs the notification message 1704 on the display unit 804. The controller 801 autonomously parks the vehicle at the second parking-available space 1702 when the notification message 1704 is selected or the second parking-available space 1702 is selected.

That is, the controller 801 selects a parking-available space located at the right of a currently-driving road of the vehicle, other than a parking-available space located at the left of the currently-driving road of the vehicle, and recommends the selected parking-available space to the driver.

As described above, the system can provide a parking-available space to a plurality of vehicles through AR information. For example, the system can provide an effect of lending a parking-available space of a private land to an arbitrary vehicle through the AR information.

The system can detect a parking-available space through AR information. For example, the system can provide an effect of intuitively checking the parking-available space by outputting a virtual parking-available space on a real-time image captured by a camera.

The effects provided in the present application may not be limited to the aforementioned, and unspecified other effects can be clearly understood by those skilled in the art from the description of the claims.

The vehicle control device 800 described above may include a vehicle 100.

Also, the operations or control methods of the vehicle control device 800 may be applied equally/similarly to operations or control methods of the vehicle 100 (or the controller 170).

Also, every function, configuration or control method performed by the vehicle control device 800 may be performed by the controller 170 provided in the vehicle 100. That is, every control method described in this specification may also be applied to the control method of the vehicle and also to the control method of the control device.

The present application can be implemented as computer-readable codes in a program-recorded medium. The computer-readable medium may include all types of recording devices each storing data readable by a computer system. Examples of such computer-readable media may include hard disk drive (HDD), solid state disk (SSD), silicon disk drive (SDD), ROM, RAM, CD-ROM, magnetic tape, floppy disk, optical data storage element and the like. Also, the computer-readable medium may also be implemented as a format of carrier wave (e.g., transmission via an Internet). The computer may include the controller 180 of the terminal. Therefore, it should also be understood that the above-described implementations are not limited by any of the details of the foregoing description, unless otherwise specified, but rather should be construed broadly within its scope as defined in the appended claims, and therefore all changes and modifications that fall within the metes and bounds of the claims, or equivalents of such metes and bounds are therefore intended to be embraced by the appended claims.

What is claimed is:

1. A vehicle control device, comprising:
a communication unit configured to receive parking registration information including one or more parking-available spaces registered in a server;
a camera that is configured to capture an outside image of a vehicle in real time;
a display that is configured to present the outside image of the vehicle in real time; and
a controller that is configured to:
detect a virtual parking-available space that corresponds to an actual parking-available space in an area captured in the outside image based on the received parking registration information,
generate parking space information based on the virtual parking-available space,
provide the parking space information to the display to overlay the parking space information over the outside image on the display,
in response to a user input for accessing a parking space setting menu, provide a graphical user interface to the display, the graphical user interface including at least one of a first item to receive first information regarding a parking-available space, a second item to receive second information regarding a parking-available time for the parking-available space, or a third item to receive third information regarding a parking fee for the parking-available space, and
register, via the communication unit, the parking-available space as a new parking-available space in the server based on a user input received via the graphical user interface.

2. The vehicle control device of claim 1, wherein the parking space information includes:
a virtual parking line that indicates the virtual parking-available space in the outside image and that is overlaid over the outside image on the display.

3. The vehicle control device of claim 1, wherein the parking space information includes:
at least one of a parking-available time, a parking fee, or a parking request approval message, and
wherein the controller is configured to:
determine whether the vehicle enters the actual parking-available space that corresponds to the virtual parking-available space, and
based on a determination that the vehicle enters the actual parking-available space, provide the parking space information to the display.

4. The vehicle control device of claim 1, wherein the controller is configured to:
send a parking request to a server computer system that manages the actual parking-available space,
in response to the parking request, receiving a parking approval message from the server computer system, and
make a transaction to pay a parking fee for the actual parking-available space.

5. The vehicle control device of claim 1, wherein the controller is configured to:
determine a location of the vehicle relative to the actual parking-available space based on (i) a global positioning system (GPS) signal or (ii) a vehicle detection signal that is received from a parking position detecting sensor located in the actual parking-available space.

6. The vehicle control device of claim 5, wherein the controller is configured to:
based on the location of the vehicle, determine whether the vehicle enters the actual parking-available space,
based on a determination that the vehicle enters the actual parking-available space, receive, from the parking position detecting sensor, a notification signal that represents whether the vehicle is authorized or reserved to park in the actual parking-available space corresponding the virtual parking-available space, and
provide the notification signal to the display.

7. The vehicle control device of claim 6, wherein the controller is configured to:
based on the notification signal that represents that the vehicle is unauthorized or unreserved to park in the actual parking-available space, search for a first virtual parking-available space that is adjacent to the location of the vehicle, and
provide, to the display, navigation information to a first actual parking-available space corresponding to the first virtual parking-available space.

8. The vehicle control device of claim 1, wherein the controller is configured to:
transmit the first information, the second information, and the third information to a first vehicle through one or more networks.

9. The vehicle control device of claim 1, wherein the controller is configured to:
determine that a parked position of the vehicle is the parking-available space without receiving the first information from a user.

10. The vehicle control device of claim 1, wherein the controller is configured to:
receive first user input that selects the first item of the graphical user interface,
in response to the first user input, provide, to the display, a preview image that is captured by the camera in real time and that includes one or more objects,
receive second user input that selects a first object from the one or more objects, and
in response to the second user input, determine that a location corresponding to the first object is the parking-available space without receiving the first information from a user.

11. The vehicle control device of claim 1, wherein the controller is configured to:
receive first user input that selects the first item of the graphical user interface,
in response to the first user input, provide, to the display, a preview image that is captured by the camera in real time and that includes one or more objects,
receive second user input that selects a first object from the one or more objects, and
in response to the second user input, provide, to the display, an area image that is overlaid over the first object on the preview image.

12. The vehicle control device of claim 11, wherein the area image represents a virtual parking line.

13. The vehicle control device of claim 1, wherein the controller is configured to:
provide, to a server computer system, registration information that requests to register coordinate values corresponding to a current location of the vehicle as the parking-available space.

14. The vehicle control device of claim 1, wherein the graphical user interface further includes:
a fourth item to receive fourth information regarding a type of a vehicle to be parked at the parking-available space.

15. The vehicle control device of claim 1, wherein the controller is configured to:
determine whether the vehicle is within a first distance from the actual parking-available space corresponding to the virtual parking-available space, and
based on a determination that the vehicle is within the first distance from the actual parking-available space, initiate detecting the virtual parking-available space from the outside image in real time.

16. The vehicle control device of claim 1, wherein the controller is configured to:
determine a speed of the vehicle, and
based on the speed of the vehicle, initiate detecting the virtual parking-available space from the outside image in real time.

17. The vehicle control device of claim 1, wherein the controller is configured to:
determine whether a parking-available time for the parking-available space has elapsed, and
based on a determination that the parking-available time has elapsed, generate a notification message and provide the notification message to the display.

18. The vehicle control device of claim 1, wherein the controller is configured to:
determine whether a parking-available time for the parking-available space has elapsed, and
based on a determination that the parking-available time has elapsed, make a transaction to pay for a parking fee for the virtual parking-available space.

19. The vehicle control device of claim 1, wherein the controller is configured to:
detect a plurality of virtual parking-available spaces from the outside image, obtain priority information that represents priorities among the plurality of virtual parking-available spaces, based on the priority information, determine a first virtual parking-available space from the plurality of virtual parking-available spaces, and provide, to the display, (i) the first virtual parking-available space with emphasis and (ii) other virtual parking-available spaces of the plurality of virtual parking-available spaces other than the first virtual parking-available space without emphasis.

20. A method for controlling a vehicle, the method comprising:

receiving parking registration information including one or more parking-available spaces registered in a server;

capturing an outside image of the vehicle in real time using a camera;

displaying the outside image of the vehicle in real time on a display;

detecting a virtual parking-available space that corresponds to an actual parking-available space in an area captured in the outside image based on the received parking registration information;

generating parking space information based on the virtual parking-available space;

providing the parking space information to the display to overlay the parking space information over the outside image to be presented on the display;

in response to a user input for accessing a parking space setting menu, providing a graphical user interface to the display, the graphical user interface including at least one of a first item to receive first information regarding a parking-available space, a second item to receive second information regarding a parking-available time for the parking-available space, or a third item to receive third information regarding a parking fee for the parking-available space; and registering the parking-available space as a new parking-available space in the server based on a user input received via the graphical user interface.

* * * * *